(12) United States Patent
Wright et al.

(10) Patent No.: US 8,999,279 B2
(45) Date of Patent: Apr. 7, 2015

(54) LAMINAR FLOW AIR COLLECTOR WITH SOLID SORBENT MATERIALS FOR CAPTURING AMBIENT $CO_2$

(75) Inventors: Allen B. Wright, Tucson, AZ (US); Klaus S. Lackner, Dobbs Ferry, NY (US); Ryuhei Ishikawa, Tucson, AZ (US)

(73) Assignee: Carbon Sink, Inc., Huntington, NY (US)

( * ) Notice: Subject to any disclaimer, the term of this patent is extended or adjusted under 35 U.S.C. 154(b) by 608 days.

(21) Appl. No.: 12/996,589

(22) PCT Filed: Jun. 4, 2009

(86) PCT No.: PCT/US2009/046306
§ 371 (c)(1),
(2), (4) Date: Mar. 28, 2011

(87) PCT Pub. No.: WO2009/149292
PCT Pub. Date: Dec. 10, 2009

(65) Prior Publication Data
US 2011/0189075 A1    Aug. 4, 2011

Related U.S. Application Data

(60) Provisional application No. 61/080,630, filed on Jul. 14, 2008, provisional application No. 61/074,976, filed on Jun. 23, 2008, provisional application No. 61/058,879, filed on Jun. 4, 2008, provisional application No. 61/058,881, filed on Jun. 4, 2008.

(51) Int. Cl.
*B01D 53/81*    (2006.01)
*B01D 53/96*    (2006.01)
(Continued)

(52) U.S. Cl.
CPC ............ *B01D 53/0423* (2013.01); *B01D 53/62* (2013.01); *B01D 2253/102* (2013.01); *B01D 2253/104* (2013.01); *B01D 2253/108* (2013.01);
(Continued)

(58) Field of Classification Search
None
See application file for complete search history.

(56) References Cited

U.S. PATENT DOCUMENTS

| 1,031,799 A | 7/1912 | MacKay |
| 1,296,889 A | 3/1919 | White ........................ 100/187 |

(Continued)

FOREIGN PATENT DOCUMENTS

| CA | 1 212 522 | 10/1986 |
| CA | 1 236 877 | 5/1988 |

(Continued)

OTHER PUBLICATIONS

Canadian Official Actin dated Jun. 21, 2011, Appln. No. 2,577,685.
(Continued)

*Primary Examiner* — Stanley Silverman
*Assistant Examiner* — Daniel Berns
(74) *Attorney, Agent, or Firm* — Wilson Sonsini Goodrich & Rosati

(57) ABSTRACT

The present disclosure provides a method for removing carbon dioxide from a gas stream without consuming excess energy, wherein a solid sorbent material is used to capture the carbon dioxide. The solid sorbent material may utilize a water-swing for regeneration. Various geometric configurations are disclosed for advantageous recovery of $CO_2$ and regeneration of the sorbent material.

13 Claims, 17 Drawing Sheets

(51) Int. Cl.
*B01D 53/14* (2006.01)
*B01D 53/04* (2006.01)
*B01D 53/62* (2006.01)

(52) U.S. Cl.
CPC ..... *B01D 2253/206* (2013.01); *B01D 2257/302* (2013.01); *B01D 2257/504* (2013.01); *B01D 2259/40083* (2013.01); *B01D 2259/4591* (2013.01); *Y02C 10/04* (2013.01); *Y02C 10/08* (2013.01)

(56) References Cited

U.S. PATENT DOCUMENTS

| | | |
|---|---|---|
| 1,482,367 A | 1/1924 | Elledge |
| 2,718,454 A | 9/1955 | Wylie ............................ 423/229 |
| 2,796,145 A | 6/1957 | King ............................... 96/262 |
| 3,024,207 A | 3/1962 | Shaw et al. ...................... 521/28 |
| 3,063,195 A | 11/1962 | Ravich ............................. 47/17 |
| 3,111,485 A | 11/1963 | Kunin |
| 3,282,831 A | 11/1966 | Hamm |
| 3,294,488 A | 12/1966 | Dunlop et al. |
| 3,318,588 A | 5/1967 | Russell et al. ................. 261/153 |
| 3,330,750 A | 7/1967 | McRae et al. ................. 204/524 |
| 3,344,050 A | 9/1967 | Mayland et al. .............. 205/555 |
| 3,554,691 A | 6/1968 | Kuo et al. |
| 3,466,019 A | 9/1969 | Priestley |
| 3,466,138 A | 9/1969 | Spiegler et al. ..................... 23/2 |
| 3,470,708 A | 10/1969 | Weil et al. |
| 3,489,506 A | 1/1970 | Galstaun et al. .............. 423/233 |
| 3,498,026 A | 3/1970 | Messinger et al. ................ 55/73 |
| 3,556,716 A | 1/1971 | Pollio et al. |
| 3,561,926 A | 2/1971 | McElroy |
| 3,594,989 A | 7/1971 | Bastiaans ........................ 55/142 |
| 3,627,478 A | 12/1971 | Tepper ........................... 423/230 |
| 3,627,703 A | 12/1971 | Kojima ........................... 260/2.1 |
| 3,645,072 A | 2/1972 | Clapham ........................ 55/387 |
| 3,691,109 A | 9/1972 | Larsen ....................... 260/2.1 R |
| 3,710,778 A | 1/1973 | Cornelius ......................... 128/2 |
| 3,712,025 A | 1/1973 | Wallace ............................. 55/2 |
| 3,727,375 A | 4/1973 | Wallace ............................. 55/2 |
| 3,876,738 A | 7/1973 | Marinaccio et al. ............. 264/41 |
| 3,833,710 A | 9/1974 | Deschamps et al. .......... 423/573 |
| 3,841,558 A | 10/1974 | Fowler et al. |
| 3,848,577 A | 11/1974 | Storandt |
| 3,865,924 A | 2/1975 | Gidaspow et al. ............. 423/230 |
| 3,876,565 A | 4/1975 | Takashima et al. ............ 260/2.1 |
| 3,880,981 A | 4/1975 | Garingarao et al. |
| 3,891,411 A | 6/1975 | Meyer |
| 3,907,967 A | 9/1975 | Filss ............................... 423/210 |
| 3,915,822 A | 10/1975 | Veltman ......................... 204/151 |
| 3,948,627 A | 4/1976 | Schwarz et al. .................. 55/54 |
| 3,981,698 A | 9/1976 | Leppard ............................ 55/31 |
| 4,012,206 A | 3/1977 | Macriss et al. .................... 55/34 |
| 4,047,894 A | 9/1977 | Kuhl ............................... 23/284 |
| 4,140,602 A | 2/1979 | Lewis et al. |
| 4,167,551 A | 9/1979 | Tamura et al. .................... 521/27 |
| 4,197,421 A | 4/1980 | Steinberg ....................... 585/733 |
| 4,238,305 A | 12/1980 | Gancy et al. ................... 204/180 |
| 4,239,515 A | 12/1980 | Yanagioka et al. .............. 55/223 |
| 4,246,241 A | 1/1981 | Mathur et al. ................... 423/179 |
| 4,249,317 A | 2/1981 | Murdoch |
| 4,296,050 A | 10/1981 | Meier ........................... 261/112.2 |
| 4,321,410 A | 3/1982 | Ono et al. |
| 4,336,227 A | 6/1982 | Koyama et al. |
| 4,340,480 A | 7/1982 | Pall et al. ....................... 210/490 |
| 4,398,927 A | 8/1983 | Asher et al. |
| 4,409,006 A | 10/1983 | Mattia |
| 4,425,142 A | 1/1984 | Mann |
| 4,436,707 A | 3/1984 | Karwat ........................... 423/226 |
| 4,475,448 A | 10/1984 | Shoaf et al. .................... 99/323.1 |
| 4,497,641 A | 2/1985 | Brown, Jr. et al. .............. 55/240 |
| 4,511,375 A | 4/1985 | BeVier .............................. 55/28 |
| 4,528,248 A | 7/1985 | Galbraith et al. .................. 429/8 |
| 4,543,112 A | 9/1985 | Ackley et al. |
| 4,566,221 A | 1/1986 | Kossin ........................... 47/41.12 |
| 4,569,150 A | 2/1986 | Carlson et al. |
| 4,592,817 A | 6/1986 | Chlanda et al. ................ 204/534 |
| 4,594,081 A | 6/1986 | Kroll et al. ....................... 96/235 |
| 4,608,140 A | 8/1986 | Goldstein ................... 435/173.9 |
| 4,678,648 A | 7/1987 | Wynn ............................. 423/228 |
| 4,711,097 A | 12/1987 | Besik |
| 4,711,645 A | 12/1987 | Kumar .............................. 55/26 |
| 4,729,883 A | 3/1988 | Lam et al. ..................... 423/228 |
| 4,735,603 A | 4/1988 | Goodson et al. |
| 4,770,777 A | 9/1988 | Steadly et al. ................. 210/490 |
| 4,804,522 A | 2/1989 | Hass ............................. 423/23.5 |
| 4,810,266 A | 3/1989 | Zinnen et al. .................... 55/68 |
| 4,861,360 A | 8/1989 | Apffel ............................... 62/17 |
| 4,869,894 A | 9/1989 | Wang et al. ..................... 423/650 |
| 4,899,544 A | 2/1990 | Boyd .............................. 60/618 |
| 4,906,263 A | 3/1990 | Von Blucher et al. .......... 96/135 |
| 4,941,898 A | 7/1990 | Kimura .......................... 96/282 |
| 4,946,620 A * | 8/1990 | Kadono et al. ................ 252/190 |
| 4,953,544 A | 9/1990 | Hansen et al. |
| 4,957,519 A | 9/1990 | Chen |
| 4,980,098 A | 12/1990 | Connery |
| 5,069,688 A | 12/1991 | Wells |
| 5,070,664 A | 12/1991 | Groh et al. ........................ 52/177 |
| 5,170,633 A | 12/1992 | Kaplan |
| 5,180,750 A | 1/1993 | Sugaya et al. .................. 521/32 |
| 5,203,411 A | 4/1993 | Dawe et al. |
| 5,215,662 A | 6/1993 | Johnson et al. ........... 210/500.38 |
| 5,253,682 A | 10/1993 | Hackette et al. |
| 5,277,915 A | 1/1994 | Provonchee et al. .......... 424/485 |
| 5,281,254 A | 1/1994 | Birbara et al. ..................... 95/44 |
| 5,304,234 A | 4/1994 | Takatsuka et al. |
| 5,308,466 A | 5/1994 | Ganzi et al. .................... 204/151 |
| 5,316,637 A | 5/1994 | Ganzi et al. ................. 204/182.4 |
| 5,318,758 A | 6/1994 | Fujii et al. ...................... 423/228 |
| 5,328,851 A | 7/1994 | Zaromb |
| 5,344,627 A | 9/1994 | Fujii et al. ..................... 423/220 |
| 5,385,610 A | 1/1995 | Deerer et al. ................... 118/241 |
| 5,389,257 A | 2/1995 | Todd et al. ..................... 210/602 |
| 5,401,475 A | 3/1995 | Ayala et al. |
| 5,409,508 A | 4/1995 | Erickson |
| 5,414,957 A | 5/1995 | Kenney ........................ 47/12.12 |
| 5,443,740 A | 8/1995 | Schmitt |
| 5,454,189 A | 10/1995 | Graham et al. ............... 47/41.12 |
| 5,520,894 A | 5/1996 | Heesink et al. |
| 5,525,237 A | 6/1996 | Birbara et al. ................. 210/670 |
| 5,535,989 A | 7/1996 | Sen ............................. 261/112.1 |
| 5,658,372 A | 8/1997 | Gadkaree ........................ 95/116 |
| 5,659,974 A | 8/1997 | Graeff |
| 5,682,709 A | 11/1997 | Erickson ...................... 47/58.1 R |
| 5,711,770 A | 1/1998 | Malina ......................... 48/197 R |
| 5,747,042 A | 5/1998 | Choquet |
| 5,756,207 A | 5/1998 | Clough et al. .................. 428/375 |
| 5,779,767 A | 7/1998 | Golden et al. ..................... 95/96 |
| 5,788,826 A | 8/1998 | Nyberg ........................... 204/536 |
| 5,792,440 A | 8/1998 | Huege |
| 5,797,979 A | 8/1998 | Quinn ............................... 95/97 |
| 5,833,747 A | 11/1998 | Bleakley et al. |
| 5,876,488 A | 3/1999 | Birbara et al. ................... 95/139 |
| 5,887,547 A | 3/1999 | Caveny et al. ................. 119/174 |
| 2,922,489 A | 6/1999 | Lee |
| 5,914,455 A | 6/1999 | Jain et al. .......................... 95/96 |
| 5,917,136 A | 6/1999 | Gaffney et al. .................... 95/98 |
| 5,934,379 A | 8/1999 | Ostlyngen et al. .............. 169/46 |
| 5,955,043 A | 9/1999 | Neuman et al. .............. 423/206.2 |
| 5,962,545 A | 10/1999 | Chaudhary et al. |
| 5,972,080 A | 10/1999 | Nagata ............................. 96/13 |
| 5,980,611 A | 11/1999 | Kumar et al. ..................... 95/101 |
| 6,004,381 A | 12/1999 | Rohrbach et al. ................ 95/211 |
| 6,027,552 A | 2/2000 | Ruck et al. |
| 6,048,509 A | 4/2000 | Kawai et al. |
| 6,083,740 A | 7/2000 | Kodo et al. ..................... 435/266 |
| 6,117,404 A | 9/2000 | Mimura et al. ................ 423/228 |
| 6,136,075 A | 10/2000 | Bragg et al. ..................... 96/135 |
| 6,158,623 A | 12/2000 | Benavides et al. |
| 6,180,012 B1 | 1/2001 | Rongved ....................... 210/717 |
| 6,200,543 B1 | 3/2001 | Allebach et al. |
| 6,214,303 B1 | 4/2001 | Hoke et al. |
| 6,221,225 B1 | 4/2001 | Mani ............................. 204/523 |
| 6,228,145 B1 | 5/2001 | Falk-Pedersen et al. ......... 95/44 |

(56) References Cited

U.S. PATENT DOCUMENTS

| | | | |
|---|---|---|---|
| 6,237,284 B1 | 5/2001 | Erickson | 47/58.1 R |
| 6,279,576 B1 | 8/2001 | Lambert | 128/205.28 |
| 6,284,021 B1 | 9/2001 | Lu et al. | |
| 6,306,803 B1 | 10/2001 | Tazaki | 508/539 |
| 6,316,668 B1 | 11/2001 | King et al. | 562/580 |
| 6,322,612 B1* | 11/2001 | Sircar et al. | 95/97 |
| 6,334,886 B1 | 1/2002 | Barnes, Jr. et al. | 95/181 |
| 6,364,938 B1 | 4/2002 | Birbara et al. | 95/139 |
| 6,402,819 B1 | 6/2002 | De Ruiter et al. | 96/153 |
| 6,500,236 B2 | 12/2002 | Suzuki et al. | |
| 6,503,957 B1 | 1/2003 | Bernatowicz et al. | 521/27 |
| 6,526,699 B1 | 3/2003 | Foglio | |
| 6,547,854 B1 | 4/2003 | Gray et al. | 95/139 |
| 6,565,627 B1 | 5/2003 | Golden et al. | |
| 6,582,498 B1 | 6/2003 | Sass et al. | 95/211 |
| 6,617,014 B1 | 9/2003 | Thomson | 428/304.4 |
| 6,632,848 B2 | 10/2003 | Sugaya | |
| 6,645,272 B2 | 11/2003 | Lemaire et al. | 95/174 |
| 6,716,888 B2 | 4/2004 | Bernatowicz et al. | 521/27 |
| 6,755,892 B2 | 6/2004 | Nalette et al. | 95/139 |
| 6,814,021 B1 | 11/2004 | Turkewitz et al. | |
| 6,830,596 B1 | 12/2004 | Deckman et al. | |
| 6,863,713 B1 | 3/2005 | Ghosal et al. | 95/117 |
| 6,890,497 B2 | 5/2005 | Rau et al. | 423/220 |
| 6,908,497 B1 | 6/2005 | Sirwardane | 95/136 |
| 6,969,466 B1 | 11/2005 | Starner | 210/663 |
| 7,067,456 B2 | 6/2006 | Fan et al. | 502/400 |
| 7,132,090 B2 | 11/2006 | Dziedzic et al. | 423/230 |
| 7,270,796 B2 | 9/2007 | Kemp et al. | 423/549 |
| 7,343,341 B2 | 3/2008 | Sandor et al. | 705/37 |
| 7,364,608 B2 | 4/2008 | Tanahashi et al. | 96/108 |
| 7,384,621 B2 | 6/2008 | Stevens et al. | 423/650 |
| 7,415,418 B2 | 8/2008 | Zimmerman | 705/1 |
| 7,420,004 B2 | 9/2008 | Hardy et al. | 518/704 |
| 7,604,787 B2 | 10/2009 | Maroto-Valer et al. | |
| 7,655,069 B2 | 2/2010 | Wright et al. | 95/92 |
| 7,699,909 B2 | 4/2010 | Lackner et al. | |
| 7,708,806 B2 | 5/2010 | Wright et al. | 95/139 |
| 7,776,296 B2 | 8/2010 | Sarlis | 423/229 |
| 7,795,175 B2 | 9/2010 | Olah et al. | |
| 7,833,328 B2 | 11/2010 | Lackner et al. | |
| 7,993,432 B2 | 8/2011 | Wright et al. | 95/139 |
| 8,083,836 B2 | 12/2011 | Wright et al. | |
| 8,133,305 B2 | 3/2012 | Lackner et al. | |
| 8,221,527 B1 | 7/2012 | Wright et al. | |
| 8,702,847 B2 | 4/2014 | Lackner et al. | |
| 8,715,393 B2 | 5/2014 | Wright et al. | |
| 2001/0004895 A1 | 6/2001 | Preiss | 128/205.28 |
| 2001/0009124 A1 | 7/2001 | Suzuki et al. | 95/113 |
| 2001/0022952 A1 | 9/2001 | Rau et al. | 422/169 |
| 2002/0083833 A1 | 7/2002 | Nalette et al. | 95/139 |
| 2002/0102674 A1 | 8/2002 | Anderson | 435/174 |
| 2002/0178925 A1 | 12/2002 | Mimura et al. | 96/299 |
| 2003/0022948 A1 | 1/2003 | Seiki et al. | 518/704 |
| 2003/0041733 A1 | 3/2003 | Seguin et al. | |
| 2003/0145726 A1 | 8/2003 | Gueret et al. | 95/96 |
| 2003/0167692 A1 | 9/2003 | Jewell et al. | 48/197 |
| 2003/0205692 A1 | 11/2003 | Fleming et al. | 252/70 |
| 2003/0220188 A1 | 11/2003 | Marand et al. | 502/60 |
| 2004/0031424 A1 | 2/2004 | Pope | 110/230 |
| 2004/0069144 A1 | 4/2004 | Wegeng et al. | 95/106 |
| 2004/0103831 A1 | 6/2004 | Pope | 110/341 |
| 2004/0134353 A1 | 7/2004 | Gillingham et al. | 95/273 |
| 2004/0195115 A1 | 10/2004 | Colombo | 206/204 |
| 2004/0213705 A1 | 10/2004 | Blencoe et al. | 422/129 |
| 2004/0219090 A1 | 11/2004 | Dziedzic et al. | 423/437.1 |
| 2005/0011770 A1 | 1/2005 | Katsuyoshi et al. | 205/742 |
| 2005/0063956 A1 | 3/2005 | Bernklau et al. | 424/93.4 |
| 2005/0092176 A1 | 5/2005 | Ding et al. | 95/90 |
| 2005/0095486 A1 | 5/2005 | Hamamoto et al. | 429/33 |
| 2005/0204915 A1 | 9/2005 | Sammons et al. | 95/45 |
| 2005/0252215 A1 | 11/2005 | Beaumont | 60/753 |
| 2005/0269094 A1 | 12/2005 | Harris | 166/302 |
| 2005/0279095 A1 | 12/2005 | Goldman | 60/641.8 |
| 2006/0013963 A1 | 1/2006 | Thomson | 427/487 |
| 2006/0042209 A1 | 3/2006 | Dallas et al. | 55/524 |
| 2006/0051274 A1 | 3/2006 | Wright et al. | 423/220 |
| 2006/0150811 A1 | 7/2006 | Callahan et al. | |
| 2006/0186562 A1 | 8/2006 | Wright et al. | 261/94 |
| 2006/0249020 A1 | 11/2006 | Tonkovich et al. | 95/115 |
| 2006/0289003 A1 | 12/2006 | Lackner et al. | 128/200.24 |
| 2007/0004023 A1 | 1/2007 | Trachtenberg | 435/266 |
| 2007/0089605 A1 | 4/2007 | Lampinen | 95/139 |
| 2007/0149398 A1 | 6/2007 | Jones et al. | 502/402 |
| 2007/0187247 A1 | 8/2007 | Lackner et al. | 204/518 |
| 2007/0199448 A1 | 8/2007 | Yates et al. | 95/139 |
| 2007/0217982 A1 | 9/2007 | Wright et al. | 423/230 |
| 2008/0008793 A1 | 1/2008 | Forsyth et al. | 426/118 |
| 2008/0025893 A1 | 1/2008 | Asprion et al. | 423/228 |
| 2008/0031801 A1 | 2/2008 | Lackner et al. | 423/438 |
| 2008/0087165 A1 | 4/2008 | Wright et al. | 95/51 |
| 2008/0276804 A1 | 11/2008 | Sayari et al. | |
| 2008/0293976 A1 | 11/2008 | Olah et al. | 95/139 |
| 2009/0120288 A1 | 5/2009 | Lackner et al. | 95/68 |
| 2009/0130321 A1 | 5/2009 | Liu | |
| 2009/0232861 A1 | 9/2009 | Wright et al. | 424/405 |
| 2009/0294366 A1 | 12/2009 | Wright et al. | 210/683 |
| 2010/0095842 A1 | 4/2010 | Lackner et al. | |
| 2010/0105126 A1 | 4/2010 | Wright et al. | 435/257.1 |
| 2010/0116137 A1 | 5/2010 | Wright et al. | |
| 2010/0319537 A1 | 12/2010 | Eisenberger et al. | 95/139 |
| 2011/0027157 A1 | 2/2011 | Wright et al. | |
| 2011/0033357 A1 | 2/2011 | Wright et al. | |
| 2011/0033358 A1 | 2/2011 | Wright et al. | |
| 2011/0056382 A1 | 3/2011 | Lackner et al. | |
| 2011/0079144 A1 | 4/2011 | Wright et al. | |
| 2011/0079146 A1 | 4/2011 | Wright et al. | |
| 2011/0079147 A1 | 4/2011 | Wright et al. | |
| 2011/0081709 A1 | 4/2011 | Wright et al. | |
| 2011/0081710 A1 | 4/2011 | Wright et al. | |
| 2011/0081712 A1 | 4/2011 | Wright et al. | |
| 2011/0083554 A1 | 4/2011 | Wright et al. | |
| 2011/0108421 A1 | 5/2011 | Lackner et al. | |
| 2011/0185897 A1 | 8/2011 | Wright et al. | |
| 2011/0203174 A1 | 8/2011 | Lackner et al. | |
| 2011/0203311 A1 | 8/2011 | Wright et al. | |
| 2011/0206588 A1 | 8/2011 | Lackner et al. | |
| 2011/0209614 A1 | 9/2011 | Wright et al. | |
| 2011/0293503 A1 | 12/2011 | Wright et al. | |
| 2012/0058032 A1 | 3/2012 | Lackner et al. | |
| 2013/0309756 A1 | 11/2013 | Wright et al. | |
| 2013/0336722 A1* | 12/2013 | Wright et al. | 405/129.35 |

FOREIGN PATENT DOCUMENTS

| | | | |
|---|---|---|---|
| DE | 4 130 837 | 4/1992 | B01D 15/00 |
| DE | 195 21 678 | 6/1995 | B01D 39/14 |
| DE | 197 27 295 | 1/1999 | B01D 53/04 |
| DE | 198 30 470 | 11/1999 | B01D 53/02 |
| DE | 200 01 385 | 8/2000 | B01D 47/14 |
| EP | 0 020 055 | 12/1980 | B01D 3/30 |
| EP | 0111911 | 6/1984 | 95/139 |
| EP | 0 254 137 | 1/1988 | B01D 15/04 |
| EP | 0 585 898 | 9/1994 | B01J 41/14 |
| FR | 2.029.424 | 10/1970 | H01M 27/00 |
| GB | 1 004 046 | 9/1965 | B01D 11/04 |
| GB | 1 031 799 | 6/1966 | B01J 20/28 |
| GB | 1109439 | 4/1968 | B44D 1/22 |
| GB | 1 204 781 | 9/1970 | B01D 53/20 |
| GB | 1296889 | 11/1972 | B01D 53/02 |
| GB | 1 520 110 | 10/1974 | |
| GB | 2288143 A | 10/1995 | |
| JP | 58-122022 | 7/1983 | B01D 53/38 |
| JP | 61 72 035 | 4/1986 | C08J 9/22 |
| JP | 61 227822 A | 10/1986 | |
| JP | 61-254220 A | 11/1986 | |
| JP | 61-254221 | 11/1986 | |
| JP | 63 12323 | 1/1988 | B01D 53/04 |
| JP | 63 12324 | 1/1988 | B01D 53/04 |
| JP | 63-016032 | 1/1988 | B01D 53/34 |
| JP | 63-69525 | 3/1988 | |
| JP | 63-69527 | 3/1988 | B01D 53/34 |
| JP | 1-208310 | 8/1989 | C01B 31/20 |
| JP | 1-305809 | 12/1989 | |

(56) References Cited

FOREIGN PATENT DOCUMENTS

| | | | |
|---|---|---|---|
| JP | 2 187153 A | 7/1990 | |
| JP | 03-245811 | 1/1991 | ............ B01D 53/14 |
| JP | 04-200720 | 7/1992 | |
| JP | H 05-57182 | 3/1993 | |
| JP | 06-071137 A | 3/1994 | |
| JP | 06-253682 | 9/1994 | ............ B01D 53/04 |
| JP | 10-057745 | 3/1998 | |
| JP | 2000-051634 | 2/2000 | |
| JP | 2000-107895 | 4/2000 | ............... B30B 9/04 |
| JP | 2004-089770 | 3/2004 | |
| JP | 2004-261757 | 9/2004 | ............... C02F 1/46 |
| JP | 2006-266583 A | 10/2006 | |
| JP | 2006-340683 | 12/2006 | |
| JP | 2008-116193 A | 5/2008 | |
| JP | 2011-516107 A | 5/2011 | |
| KR | 2003-0012224 A | 2/2003 | |
| RU | 2097115 | 11/1997 | |
| SD | 1 828 406 | 7/1993 | ............ B01D 53/22 |
| WO | WO 94/13386 A1 | 6/1994 | |
| WO | WO 98/16296 | 4/1998 | ............ B01D 39/16 |
| WO | WO 98/17388 | 4/1998 | ............ B01D 53/62 |
| WO | WO 98/22173 A | 5/1998 | |
| WO | WO 00/50154 | 8/2000 | ............ B01D 53/04 |
| WO | WO 00/76633 | 12/2000 | ............ B01D 53/14 |
| WO | WO 01/21269 | 3/2001 | ............ B01D 53/04 |
| WO | WO 01/51550 A1 | 7/2001 | |
| WO | WO 2005/108297 | 11/2005 | ............ C01F 11/18 |
| WO | WO 2006/009600 | 1/2006 | ............ B01D 47/00 |
| WO | WO 2006/036396 | 4/2006 | ............ B01D 53/52 |
| WO | WO 2006/084008 | 8/2006 | ............ B01D 53/04 |
| WO | WO 2007/016271 | 2/2007 | ............ B01D 53/14 |
| WO | WO 2007/016274 | 2/2007 | ............ H04L 25/03 |
| WO | WO 2007/114991 | 10/2007 | ............ G05D 23/19 |
| WO | WO 2008/042919 | 4/2008 | |
| WO | WO 2008/131132 | 4/2008 | |
| WO | WO 2008/061210 | 5/2008 | ............ B01D 53/02 |
| WO | WO 2009/149292 | 12/2009 | |

OTHER PUBLICATIONS

Chinese Official Action dated Apr. 28, 2011 Appln. No. 200780042511.8.
Chinese Official Action dated Jun. 13, 2011, Appln. No. 200780008015.0.
Huang, Houping and Chang, Shih-Ger "Method to Regenerate Ammonia for the Capture of Carbon Dioxide" Energy and Fuels 2002, 16, 904-910.
International Search Report and Written Opinion dated Nov. 24, 2010 GCC/P/2007/9020.
Japanese Official Action, Application Serial No. 2008-524154, dated May 31, 2011, 3 pgs.
Office Action dated Aug. 3, 2011 in U.S. Appl. No. 12/903,962.
Office Action dated Aug. 1, 2011 in U.S. Appl. No. 12/903,974.
Official Action dated Jul. 1, 2011 in U.S. Appl. No. 13/102,915.
Official Action issued in Applicants' counterpart European Patent Application Serial No. 07 758 183.3-1213 dated Jul. 4, 2011.
Official Action issued in Applicants' counterpart European Patent Applicatin Serial No. 07 853 742.0-1213 dated Jul. 27, 2011.
Official Action issued in Applicants' counterpart European Patent Application Serial No. 08 746 144.8-2113 / 2139584 dated May 9, 2011.
Official Action issued in Applicants' counterpart Russian Patent Application Serial No. 2009116621/05 (022802) dated Jun. 1, 2011.
Official Action received in Applicants' related Australian Patent Application Serial No. 2010241388 dated Jul. 7, 2011.
Official Action received in Applicants' related Australian Patent Application Serial No. 2007319211 dated Jun. 17, 2011.
Official Action received in Applicants' related Australian Patent Application Serial No. 2007233275 dated Jun. 1, 2011.
Official Action received in Applicants' related New Zealand Patent Application Serial No. 575870 dated Jun. 27, 2011.
Office action dated Aug. 1, 2012 for U.S. Appl. No. 12/903,877.

Office action dated Aug. 3, 2012 for U.S. Appl. No. 12/903,953.
Office action dated Aug. 8, 2012 for U.S. Appl. No. 12/903,873.
Office action dated Aug. 9, 2012 for U.S. Appl. No. 12/903,894.
Office action dated Aug. 10, 2012 for U.S. Appl. No. 12/903,886.
Office action dated Aug. 13, 2012 for U.S. Appl. No. 12/903,898.
Office action dated Aug. 28, 2012 for U.S. Appl. No. 12/903,868.
Office action dated Aug. 30, 2012 for U.S. Appl. No. 12/903,958.
Office action dated Sep. 10, 2012 for U.S. Appl. No. 13/058,802.
European search report partial dated Oct. 11, 2013 for EP Application No. 13175213.1.
Office action dated Aug. 30, 2013 for U.S. Appl. No. 13/796,855.
Office action dated Oct. 24, 2013 for U.S. Appl. No. 13/737,818.
European Official Action, Serial No. 06 788 685.3-1213, dated Oct. 12, 2011 (3 pages).
Russian Official Action, Serial No. 2008139902/15, dated Jul. 20, 2011 (Russian Attorney notified Attorney of record in instant application on Sep. 15, 2011) (6 pages).
Russian Official Action, Serial No. 200914222/05, dated Sep. 30, 2011 (9 pages).
US Official Action, U.S. Appl. No. 12/274,986, dated Nov. 3, 2011 (36 pages).
US Official Action, U.S. Appl. No. 13/208,156, dated Oct. 26, 2011 (21 pages).
US Official Action, U.S. Appl. No. 11/209,962, dated Oct. 6, 2011 (24 pages).
US Official Action, U.S. Appl. No. 12/615,971, dated Sep. 29, 2011 (33 pages).
US Official Action, U.S. Appl. No. 13/102,915, dated Sep. 27, 2011 (10 pages).
US Official Action, U.S. Appl. No. 12/389,213, dated Sep. 27, 2011 (27 pages).
US Notice of Allowance, U.S. Appl. No. 12/265,556, dated Nov. 7, 2011 (33 pages).
U.S. Appl. No. 13/733,227, filed Jan. 3, 2013, Wright et al.
U.S. Appl. No. 13/737,818, filed Jan. 9, 2013, Wright et al.
Korean office action dated Nov. 20, 2012 for KR Application 10-2008-7004729.
Mexican office action dated Oct. 29, 2012 for MX/a/2008/001054.
Office action dated Nov. 9, 2012 for U.S. Appl. No. 13/045,317.
Office action dated Dec. 7, 2012 for U.S. Appl. No. 13/295,950.
Office action dated Dec. 20, 2012 for U.S. Appl. No. 11/209,962.
Russian office action dated Jan. 5, 2013 for RU Application 2008139902.
U.S. Appl. No. 13/463,359, filed May 3, 2012, Lackner et al.
U.S. Appl. No. 13/550,691, filed Jul. 17, 2012, Wright et al.
U.S. Appl. No. 13/557,701, filed Jul. 25, 2012, Lackner et al.
International search report and written opinion dated May 21, 2012 for PCT/US2009/053450.
Office action dated Mar. 14, 2012 for U.S. Appl. No. 11/209,962.
Office action dated Apr. 13, 2012 for U.S. Appl. No. 13/102,901.
Office action dated May 4, 2012 for U.S. Appl. No. 13/295,950.
Office action dated May 26, 2011 for U.S. Appl. No. 11/209,962.
Office action dated Jul. 3, 2012 for U.S. Appl. No. 13/102,901.
Office action dated Jul. 16, 2012 for U.S. Appl. No. 12/389,213.
Zeman, et al. Capturing carbon dioxide directly from the atmosphere. World resource review. 2004; 16(2):157-172.
Astarita. Mass Transfer with Chemical Reaction. Amsterdam: Elsevier Publishing Company. 1967; 144-152.
Besra, et al. Particle Characteristics and Their Influence on Dewatering of Kaolin, Calcite and Quartz Suspensions. Int. J. Miner. Process. 2000; 59:89-122.
Blok, et al. Hydrogen Production From Natural Gas, Sequestration of Recovered CO2 in Depleted Gas Wells and Enhanced Natural Gas Recovery. Energy. 1997; 22(2-3):161-168.
Boynton. Chemistry and Technology of Lime and Limestone. New York: Interscience Publishers. 1966; 204-206.
Desideri, et al. Performance Modelling of a Carbon Dioxide Removal System for Power Plants. Energy Conversion and Management. 1999; 40:1899-1915.
Dillon, et al. Oxy-Combustion Processes for CO2 Capture From Advanced Supercritical PF and NGCC Power Plant. Greenhouse Gas

(56) References Cited

OTHER PUBLICATIONS

Control Technologies 7, Proceedings of the 7th International Conference on Greenhouse Gas Control Technologies Sep. 5, 2004, Vancouver, Canada. 211-220.
Hanson, et al. Steam Drying and Fluidized-Bed Calcination of Lime Mud. Tappi Journal. 1993; 76(11):181-188.
Herzog, et al. Carbon Dioxide Recovery and Disposal From Large Energy Systems. Annu. Rev. Energy Environ. 1996; 21:145-166.
International preliminary report on patentability dated Nov. 7, 2006 for PCT/US2005/015453.
International preliminary report on patentability dated Nov. 7, 2006 for PCT/US2005/015454.
International search report and written opinion dated Nov. 15, 2005 for PCT/US2005/015453.
International search report and written opinion dated Dec. 21, 2005 for PCT/US2005/015454.
Keith, et al. Co2 Capture From the Air: Technology Assessment and Implications for Climate Policy. Greenhouse Gas Control Technologies 6. Proceedings of the 6th International Conference on Greenhouse Gas Control Technologies Oct. 1-4, 2002, Kyoto, Japan; 187-192.
Konno, et al. Crystallization of Aragonite in the Causticizing Reaction. Powder Technology. 2002; 123:33-39.
Meier, et al. Design and Experimental Investigation of a Horizontal Rotary Reactor for the Solar Thermal Production of Lime. Energy. 2004; 29:811-821.
Olsson, et al. Thermophysical Properties of Aqueous NaOH-H20 Solutions at High Concentrations. International Journal of Thermophysics. 1997; 18(3):779-793.
Singh. Technical Note Ultrasonically Assisted Rapid Solid-Liquid Separation of Fine Clean Coal Particles. Minerals Engineering. 1999; 12(4):437-443.
White, et al. Separation and capture of CO2 from large stationary sources and sequestration in geological formations—coalbeds and deep saline aquifers. J Air Waste Manag Assoc. Jun. 2003;53(6):645-715.
Zsako, et al Use of Thermal Analysis in the Study of Sodium Carbonate Causticization by Means of Dolomitic Lime. Journal of Thermal Analysis. 1998; 53:323-331.
U.S. Appl. No. 12/596,642, filed Oct. 19, 2009, Wright et al.
Abstracts of Eos. Trans. AGU, 82 (47), Fall Meeting 2001; pp. 3.
Abstracts of Eos. Trans. AGU, 83 (19), Spring Meeting 2002; pp. 3.
Abstracts of Eos. Trans. AGU, 83 (47), Fall Meeting 2002; pp. 3.
"An Industrial Sized Unit" Drawing and specification.
Balster et al., "Multi-Layer Spacer Geometries With Improved Mass Transport", 2006; pp. 351-361.
Bituin, "New Findings May Redefine Renewable Energy Debate", found at http://www.dailycal.org/article.php?id=8559.
"*Carbon Sequestration Could Be Employed Today to Help Alleviate Greenhouse Emissions*" found at http://www.earthinstitute.columbia.edu/news/2003/story06-25-03b.html.
Chinese Official Action dated May 5, 2010 and Jan. 20, 2011, Appln. No. 200680030297.X.
Chinese Official Action dated Dec. 3, 2010, Appln. No. 200780008015.
Choi et al. "A new preparation for cation-exchange membrane using monomer sorption into reinforcing materials" Desalination 146. Mar. 22, 2002.
Choi et al. "Characterization of LDPE/polystyrene cation exchange membranes prepared by monomer sorption and UV radiation polymerization" Journal of Membrane Science 223 (2003) 201-215. Jul. 13, 2003.
Choi et al. "Preparation and characterization of LDPE/polyvinvylbenzyl trimethyl ammonium salts anion-exchange membrane" Journal of Membrane Science 221 (2003) 219-231. Jun. 13, 2003.
Cuiming et al. "Fundamental Studies of a New Hybrid (Inorganic-Organic) Positively Charged Membrane: Membrane Preparation and Characterizations" Journal of Membrane Science 216 (2003) 269-278 Feb. 16, 2003.
Dow Chemical Company, Dowex Type 1 Strong Base Anion Resin, 1998, http://www.inaqua.de/Prod/ion/pdf_en/313_UPCORE_Mono_A625.pdf, p. 1.
Dubey et al., "Chemical Extraction of Carbon Dioxide from Air to Sustain Fossil Energy by Avoiding Climate Change", 2nd Annual Conference on Carbon Sequestration, 2003.
Dubey et al., "Extraction of Carbon Dioxide from the Atmosphere Through Engineered Chemical Sinkage", Fuel Chemistry Division Preprints, 2001; pp. 1-4.
Dubey, "Science for Sustainability: From Capturing Carbon Dioxide From Air to Environmental Impact of a Hydrogen Economy", found at http://www.mbari.org/seminars/2003/spring2003/apr2_dubey.html.
Elliot et al., "Compensation of Atmospheric CO2 Buildup Through Engineered Chemical Sinkage", pp. 1-8.
Environment & Climate News, 2002; vol. 5, No. 7.
Fuertes et al. "Carbon Composite Membranes from Matrimid and Kapton Polymides for Gas Separation" Microporous and Mesoporous Materials 33 (1999) 115-125 Jun. 16, 1999.
Hashimoto et al., "Global CO2 recycling", (1996) Zairyo to Kankyo/Corrosion Engineering, 45 (10), pp. 614-620 (Abstract only).
Hensel, "In the Lab", found at www.eponline.com/articles/53584.
"Informatin About: David Keith" found at http://ideas.respec.org/e/pke74.html, http://www.ucalgary.ca/~keith/.
Information on David Keith found at http://www.ucalgary.ca/~keith/.
International Preliminary Report on Patentability, Dated Jan. 24, 2008 PCT/US2006/003646.
International Preliminary Report on Patentability, mailed Jun. 10, 2010 PCT/US2007/063607.
International Preliminary Report on Patentability, Aug. 11, 2009 PCT/US2009/053461.
International Preliminary Report on Patentability, Aug. 24, 2009 PCT/US2009/054795.
International Preliminary Report on Patentability, mailed Feb. 24, 2011, PCT/US09/53461.
International Preliminary Report on Patentability, Nov. 15, 2007 PCT/US2007/084880.
International Preliminary Report on Patentability, Jan. 27, 2009, PCT/US2007/84237.
International Preliminary Report on Patentability, Oct. 20, 2009, PCT/US2008/60672.
International Preliminary Report on Patentability, May 11, 2010, PCT/US2008/82505.
International Preliminary Report on Patentability, Dec. 6, 2010, PCT/US2009/46306.
International Preliminary Report on Patentability, Jun. 1, 2010, PCT/US2007/80229.
International Preliminary Report on Patentability, Jan. 29, 2008, PCT/US2006/029238.
International Search report and Written Opinion Feb. 2, 2006 PCT/US2006/003646.
International Search report and Written Opinion Jul. 28, 2006 PCT/US2006/029238.
International Search report and Written Opinion mailed Feb. 25, 2008 PCT/US2007/63607.
International Search report and Written Opinion mailed Mar. 8, 2008 PCT/US2007/80229.
International Search report and Written Opinion mailed Apr. 23, 2008 PCT/US2007/84880.
International Search report and Written Opinion mailed Sep. 15, 2008 PCT/US2008/60672.
International Search report and Written Opinion mailed Dec. 24, 2008 PCT/US2008/82505.
International Search report and Written Opinion mailed Sep. 25, 2009 PCT/US2009/53461.
International Search report and Written Opinion mailed Dec. 9, 2009 PCT/US2009/54795.
International Search report and Written Opinion mailed Jan. 27, 2009 PCT/US2008/84237.
International Search report and Written Opinion mailed Sep. 3, 2009 PCT/US2009/46306.
International Search Report and Written Opinion dated Oct. 4, 2006 PCT/US05/29584.

(56) References Cited

OTHER PUBLICATIONS

International Preliminary Report on Patentability dated Feb. 20, 2007 PCT/US05/29584.
Japanese Official Action, Application Serial No. 2009-531567, dated Feb. 7, 2011, 4 pgs.
Japanese Official Action, Application Serial No. 2008-524154, dated Feb. 16, 2011, 4 pgs.
Keith et al., "Climate Strategy with CO2 Capture from the Air" 2005; pp. 1-43.
Keith et al., "CO2 Capture From the Air: Technology Assessment and Implications for Climate Policy", pp. 1-6.
Keith et al., Resume of David Keith, Spring 2005, 8 pgs. "Climate Strategy with CO2 Capture From the Air", found at http://ideas.repec.org/p/hal/papers/halshs-00003926_v1.html.
Lackner et al., "Capturing Carbon Dioxide From Air", pp. 1-15.
Lackner et al., "Carbon Dioxide Extraction from Air?", Arguments pp. 1-5.
Lackner et al., "Carbon Dioxide Extraction from Air: Is It an Option?", Proceedings of the 24th Annual Technical Conference on Coal Utilization and Fuel Systems, 1999; pp. 885-896.
Lackner et al., "CO2 Extraction from Air" A White Paper from Los Alamos National Labs, The Reddy Corporation International, Sourcebook, Sep. 1999 (12 PGS).
Lackner et al., "Free-Market Approaches to Controlling Carbon Dioxide Emissions to the Atmosphere: A Discussion of the scientific basis", Los Alamos National Laboratory (Lackner & Ziock) & Harvard University (Wilson), pp. 1-16.
Lackner et al., "The Case for Carbon Dioxide Extraction From Air," Sourcebook, Sep. 1999; vol. 57, No. 9, pp. 6-10.
Lackner K.S., Grimes P., Ziock H-J, 'Capturing Carbon Dioxide from Air' First National Conference on Carbon Sequestration (Washington) 2001.
Lackner, Klaus S., "Can Fossil Carbon Fuel the $21^{st}$ Century?", International Geology Review, vol. 44, 2002, pp. 1122-1133.
"Extraction CO2 from the Air", Lackner presentation, 12 pages.
Liang, "Carbon Dioxide Capture From Flue Gas Using Regenerable Sodium Based Sorbents", dated Aug. 1, 2003, Department of Chemical Engineering Thesis, (137 pgs).
Liu et al., "Composite Membranes from Photochemical Synthesis of Ultrathin Polymer Films" Nature vol. 352 Jul. 4, 1991.
Mexican Official Action, Dated Jan. 24, 2011, Serial No. MX/a/2007/002019.
Mexican Official Action, Dated Feb. 2, 2011, Serial No. MX/a/2008/011464.
Mizutani, Y "Structure of Ion Exchange Membranes" Journal of Membrane Science 49 (1990) 121-144 Aug. 21, 1989.
Murdoch et al., "Sabatier Methanation Reactor for Space Exploration", (2005) A Collection of Technical Papers—$1^{st}$ Space Exploration Conference: Continuing the Voyage of Discovery, 2, pp. 981-987 (Abstract only).
"New Solutions to Oil Problems", Whitley Strieber's Unknown Country, 2002, found at http://www.unknowncountry.com/news/print.phtml?id=1467.
Office Action dated Sep. 11, 2009 in U.S. Appl. No. 11/209,962.
Office Action dated Feb. 23, 2010 in U.S. Appl. No. 11/209,962.
Office Action dated Jun. 9, 2010 in U.S. Appl. No. 11/209,962.
Office Action dated Aug. 27, 2010 in U.S. Appl. No. 11/209,962.
Office Action dated Feb. 1, 2011 in U.S. Appl. No. 11/209,962.
Office Action dated Oct. 1, 2009 in U.S. Appl. No. 11/227,660.
Office Action dated Jan. 27, 2010 in U.S. Appl. No. 11/227,660.
Office Action dated Oct. 7, 2010 in U.S. Appl. No. 11/227,660.
Office Action dated Jan. 25, 2011 in U.S. Appl. No. 11/227,660.
Office Action dated Mar. 30, 2009 in U.S. Appl. No. 11/346,522.
Office Action dated Jun. 17, 2009 in U.S. Appl. No. 11/346,522.
Office Action dated Oct. 7, 2009 in U.S. Appl. No. 11/683,824.
Office Action dated Mar. 15, 2010 in U.S. Appl. No. 11/683,824.
Office Action dated Jun. 28, 2010 in U.S. Appl. No. 11/683,824.
Office Action dated Nov. 19, 2010 in U.S. Appl. No. 11/683,824.
Office Action dated Nov. 10, 2010 in U.S. Appl. No. 11/996,615.
Office Action dated Apr. 6, 2011 in U.S. Appl. No. 11/996,615.
Office Action dated Nov. 9, 2010 in U.S. Appl. No. 12/638,717.
Office Action dated Feb. 11, 2011 in U.S. Appl. No. 12/638,717.
Office Action dated Mar. 11, 2011 in U.S. Appl. No. 12/903,962.
Office Action dated Mar. 11, 2011 in U.S. Appl. No. 12/903,967.
Office Action dated Mar. 11, 2011 in U.S. Appl. No. 12/903,970.
Office Action dated Mar. 11, 2011 in U.S. Appl. No. 12/903,974.
Office Action dated Mar. 11, 2011 in U.S. Appl. No. 12/903,981.
Official Action dated Mar. 28, 2011 in U.S. Appl. No. 12/389,213.
Official Action dated Mar. 15, 2010, U.S. Appl. No. 11/683,824, 10 pgs.
Official Action for U.S. Appl. No. 11/209,962, dated Sep. 11, 2009, (16 pgs).
Official Action issued in Applicants' counterpart Chinese Patent Application Serial No. 200680003905.8 dated Jun. 12, 2009.
Official Action issued in Applicants' counterpart European Patent Application Serial No. 05 793 918.3-1213 dated Jan. 19, 2010.
Official Action issued in Applicants' counterpart European Patent Application Serial No. 06 788 685.3-1213 dated Oct. 16, 2009.
Official Action issued in Applicants' counterpart European Patent Application Serial No. 07 758 183.3 dated Jun. 22, 2010.
Official Action issued in Applicants' counterpart European Patent Application Serial No. 07864483.8 dated Jan. 7, 2011.
Official Action issued in Applicants' counterpart Russian Patent Application Serial No. 2008139902 (051576) dated Feb. 4, 2011.
Official Action issued in Applicants' counterpart Russian Patent Application Serial No. 2008139902 dated Nov. 19, 2010.
Official Action received in Applicants' related Australian Patent Application Serial No. 2005290082 dated Apr. 20, 2007.
Official Action received in Applicants' related Australian Patent Application Serial No. 2005290082 dated Mar. 5, 2010.
Official Action received in Applicants' related Australian Patent Application Serial No. 2005290082 dated Apr. 13, 2010.
Official Action received in Applicants' related Australian Patent Application Serial No. 2005290082 dated May 20, 2010.
Official Action received in Applicants' related Australian Patent Application Serial No. 2005290082 dated Jul. 22, 2010.
Official Action received in related Australian Patent Application Serial No. 2006210619 dated Mar. 1, 2010.
Official Action received in Applicants' related Australian Patent Application Serial No. 2007233275 dated Jan. 14, 2011.
Official Action received in Applicants' related Australian Patent Application Serial No. 2007303240 dated. Feb. 9, 2011.
Official Action received in Applicants' related New Zealand Patent Application Serial No. 575870 dated Mar. 17, 2011 and Nov. 11, 2010.
"Researchers Explore Extracting CO2 Directly From Air" found at http://www.earthvision.net/ColdFusion/News_Page1.cfm?NewsID=20309.
Resume of David Keith, Academic CV, Spring 2005, 8 pgs.
Rickman, "Imagine No Restriction on Fossil-Fuel Usage and No Global Warming!", found at http://www.lanl.gov/news/releases/archive/02-028.shtml.
Russian Official Action + Translation, dated Feb. 2, 2006, Appln. No. 2007132880/15 (035886).
Russian Official Action + Translation, dated Sep. 15, 2010 Appln. No. 2007132880/15 (035886).
Russian Official Action + Translation, dated Feb. 11, 2010, Appln. No. 2007132880/15, (13 pgs).
Singer, Fred S., "Americans Believe in Global Warming . . . and Psychic Powers, Astrology, and UFO's", found at http://heartland.org/.
Snowpure, LLC, SnowPure Excellion Product Information and Brochure, Aug. 2009.
Sun et al., "$CO_2$ sorption in activated carbon in the presence of water", dated Feb. 9, 2007, Science Direct, Chemical Physics Letterse 437 (2000) (abstract enclosed).
T.Sata, "Monovalent Cation Permselective Exchange Membrane", Apr. 15, 1972, pp. 980-982.
"The Carrot or the Stick: How to Build a Technology-Friendly Climate Policy in Canada" Presentation by David Keith, Climate Change Central Apr. 15, 2005, pp. 1-32.

(56) References Cited

OTHER PUBLICATIONS

Toshikatsu Sata, "Modification of Properties of Ion Exchange Membranes. IV. Change of Transport Properties of Cation-Exchange Membranes by Various Polyelectrolytes", 1978, pp. 1063-1080.
Toshikatsu, Yukio Mizutani, "Modification of Properties of Ion Exchange Membranes. VI. Electrodialytic Transport Properties of Cation Exchange Membranes with a Electrodeposition Layer of Cationic Polyelectrolytes", 1979, pp. 1199-1213.
Toshikatsu, Yukio Mizutani, "Modification of Properties of Ion Exchange Membranes. VII. Relative Transport Number between Various Cations of Cation Exchange Membrane Having Cationic Polyelectrolyte Layer and Mechanism of Selective Permeation of Particular Cations", 1979, pp. 2071-2085.
Yin, et al., "Absorption and steam desorption performance of weak base anion exchange resin" (1995) Hangtian Yixue Yu Yixue Gongcheng/Space Medicine and Medical Engineering, 8 (1), pp. 27-31. (Abstract only).
"Written Public Comments on the Strategic Plan for the U.S. Climate Change Science Program, General Comments", 2003, pp. 1-160.
U.S. Appl. No. 13/386,587, filed Jan. 23, 2012, Lackner et al.
European examination report dated Dec. 19, 2011 for EP Application No. 08746144.8.
European search report and opinion dated Jan. 7, 2011 for EP Application No. 07864483.8.
European search report and opinion dated Apr. 20, 2011 for EP Application No. 08746144.8.
European search report and opinion dated Dec. 21, 2011 for EP Application No. 11008476.1.
International search report and written opinion dated May 12, 2009 for PCT/US2009/034554.
International search report and written opinion dated Aug. 30, 2007 for PCT/US2005/032848.
International search report and written opinion dated Sep. 3, 2009 for PCT/US2009/046306.
International search report and written opinion dated Nov. 17, 2010 for PCT/US2010/043133.
International search report and written opinion dated Dec. 9, 2009 for PCT/US2009/054795.
Office action dated Feb. 3, 2012 for U.S. Appl. No. 13/102,915.
Office action dated Feb. 4, 2010 for U.S. Appl. No. 12/555,874.
Office action dated Mar. 9, 2009 for U.S. Appl. No. 11/207,236.
Office action dated Jul. 3, 2008 for U.S. Appl. No. 11/207,236.
Office action dated Dec. 1, 2011 for U.S. Appl. No. 13/102,901.
Weber, et al. The absorption of carbon dioxide by weak base ion exchange resins. Aiche Journal. Jul. 1970; 609-614. http://onlinelibrary.wiley.com/doi/10.1002/aic.690160417/pdf.
U.S. Appl. No. 14/163,559, filed Jan. 24, 2014, Wright et al.
U.S. Appl. No. 14/183,751, filed Feb. 19, 2014, Wright et al.
Office action dated Jan. 28, 2014 for U.S. Appl. No. 13/386,587.
Office action dated Dec. 3, 2013 for U.S. Appl. No. 13/557,701.
Office action dated Dec. 9, 2013 for U.S. Appl. No. 13/550,691.
Office action dated Dec. 12, 2013 for U.S. Appl. No. 13/733,227.
U.S. Appl. No. 14/444,882, filed Jul. 28, 2014, Lackner.
Avgul, et al. Adsorption of acid gases by macroporous, weekly basic anion exchange resins with different functional groups. Colloid Journal of the USSR. A translation of Kolloidnyi Zhurnal. 1982; 43(6):837-842.
Belyakova, et al. Adsorption of carbon dioxide and water by macroporous anion-exchange resins. Colloid Journal of the USSR. A translation of Kolloidnyi Zhurnal. 1975; 37(3):484-487.
Notice of allowance dated Aug. 25, 2014 for U.S. Appl. No. 13/733,227.
Office action dated Jun. 26, 2014 for U.S. Appl. No. 13/733,227.
Office action dated Aug. 7, 2014 for U.S. Appl. No. 13/557,701.
Office action dated Aug. 15, 2014 for U.S. Appl. No. 13/550,691.
Otsuji, et al. A regenerable carbon dioxide removal and oxygen recovery system for the Japanese Experiment Module. Acta Astronaut. Jan. 1987;15(1):45-54.
Steinberg, et al. Synthetic carbonaceous fuel and feedstock using nuclear power, air and water. International Journal of Hydrogen Energy. 1977; 2:189-207.
Weimer, et al. CO2 removal and fixation solar high temperature syngas generation for fuel synthesis. Energy Convers. Mgmt. 1997; 38:S379-S384.
U.S. Appl. No. 14/257,698, filed Apr. 21, 2014, Wright et al.
European search report dated Feb. 28, 2014 for EP Application No. 13175213.1.

\* cited by examiner

LAMINAR FLOW AIR COLLECTOR WITH SOLID SORBENT MATERIALS FOR CAPTURING AMBIENT $CO_2$

This application claims the benefit of PCT/US09/46306 filed Jun. 4, 2009, under 35 U.S.C. §365; which claims the benefit under 35 U.S.C. §119(e) of U.S. Provisional Patent Application No. 61/080,630, filed Jul. 14, 2008, and U.S. Provisional Patent Application No. 61/074,976, filed Jun. 23, 2008, and U.S. Provisional Patent Application No. 61/058,879, filed Jun. 4, 2008, and U.S. Provisional Patent Application No. 61/058,881, filed Jun. 4, 2008.

The present invention in one aspect relates to removal of selected gases from the atmosphere. The invention has particular utility in connection with the extraction of carbon dioxide ($CO_2$) from the atmosphere and subsequent sequestration of the extracted $CO_2$ or conversion of the extracted $CO_2$ to useful or benign products and will be described in connection with such utilities, although other utilities are contemplated, including the extraction, sequestration or conversion of other gases from the atmosphere including $NO_x$ and $SO_2$.

There is compelling evidence to suggest that there is a strong correlation between the sharply increasing levels of atmospheric $CO_2$ with a commensurate increase in global surface temperatures. This effect is commonly known as Global Warming, and $CO_2$ is commonly called a "greenhouse gas". Of the various sources of the $CO_2$ emissions, there are a vast number of small, widely distributed emitters that are impractical to mitigate at the source. Additionally, large scale emitters such as hydrocarbon-fueled power plants are not fully protected from exhausting $CO_2$ into the atmosphere. Combined, these major sources, as well as others, have lead to the creation of a sharply increasing rate of atmospheric $CO_2$ concentration. Until all emitters are corrected at their source, other technologies are required to capture the increasing, albeit relatively low, background levels of atmospheric $CO_2$. Efforts are underway to augment existing emissions reducing technologies as well as the development of new and novel techniques for the direct capture of ambient $CO_2$. These efforts require methodologies to manage the resulting concentrated waste streams of $CO_2$ in such a manner as to prevent its reintroduction to the atmosphere.

The production of $CO_2$ occurs in a variety of industrial applications such as the generation of electricity power plants from coal and in the use of hydrocarbons that are typically the main components of fuels that are combusted in combustion devices, such as engines. Exhaust gas discharged from such combustion devices contains $CO_2$ gas, which at present is simply released to the atmosphere. However, as greenhouse gas concerns mount, $CO_2$ emissions from all sources will have to be curtailed. For mobile sources the best option is likely to be the collection of $CO_2$ directly from the air rather than from the mobile combustion device in a car or an airplane. The advantage of removing $CO_2$ from air is that it eliminates the need for storing $CO_2$ on the mobile device.

Extracting carbon dioxide ($CO_2$) from ambient air would make it possible to use carbon-based fuels and deal with the associated greenhouse gas emissions after the fact. Since $CO_2$ is neither poisonous nor harmful in parts per million quantities, but creates environmental problems simply by accumulating in the atmosphere, it is possible to remove $CO_2$ from air in order to compensate for equally sized emissions elsewhere and at different times.

Various methods and apparatus have been developed for removing $CO_2$ from air. In one prior art method, air is washed with a sorbent such as an alkaline solution in tanks filled with what are referred to as Raschig rings that maximize the mixing of the gas and liquid. The $CO_2$ reacts with and is captured by the sorbent. For the elimination of small amounts of $CO_2$, gel absorbers also have been used. Although these methods are efficient in removing $CO_2$, they have a serious disadvantage in that for them to efficiently remove carbon dioxide from the air; the air must be driven past the sorbent at fairly high pressures. The most daunting challenge for any technology to scrub significant amounts of low concentration $CO_2$ from the air involves processing vast amounts of air and concentrating the $CO_2$ without generating an excess of additional $CO_2$ in the process. For example, relatively high pressure losses occur during the scrubbing process resulting in a large expense of energy necessary to compress the air. This additional energy used in compressing the air can have an unfavorable effect with regard to the overall carbon dioxide balance of the process, as the energy required for increasing the air pressure may produce its own $CO_2$ that may exceed the amount captured negating the value of the process.

Prior art methods result in the inefficient capture of $CO_2$ from air because these prior art methods heat or cool the air, or change the pressure of the air by substantial amounts. As a result, the net reduction in $CO_2$ is negligible as the cleaning process may introduce $CO_2$ into the atmosphere as a byproduct of the generation of electricity used to power the process.

For example, the art has proposed various schemes for removal of $CO_2$ from combustion exhaust gases or directly from the air by subjecting the gases or air to a pressure swing or a thermal swing using a $CO_2$ adsorbent. These processes use pressure or temperature changes, respectively, to change the state of the sorbent material, whereby to release the $CO_2$. See, for example, U.S. Pat. No. 5,318,758; U.S. Pat. No. 5,914,455; U.S. Pat. No. 5,980,611; and U.S. Pat. No. 6,117,404.

None of these prior art references, however, provides an adequately efficient process for the removal of $CO_2$, primarily due to the amount of energy expended in $CO_2$ recovery and sorbent regeneration.

The present disclosure improves upon the prior art by providing an apparatus and method for extracting carbon dioxide ($CO_2$) from an air stream using a solid sorbent material and for recovering that $CO_2$ using a variety of advantageous features that will be discussed below.

A first aspect of the present invention provides a system, i.e., method and apparatus for extracting carbon dioxide ($CO_2$) from ambient air, using a laminar scrubbing system formed of or supporting solid sorbent materials. The laminar scrubbing system is comprised of a plurality of air collection surfaces that may be formed of a solid sorbent material or formed of a substrate wherein a sorbent is deposited as a film on the surface of the substrate. Several advantageous configurations of air collector elements are disclosed. The collection surfaces may be roughened by regular or random methods. Other elements may be included for directing the air stream or for steering the laminar scrubber relative to the direction of the air stream.

Another aspect of the present disclosure provides various designs using solid ion exchange materials for $CO_2$ capture. More particularly, in accordance with the present invention, thin strips of solid ion exchange material are attached together to a wire core in the form of a "bottlebrush" like structure. The strips may be formed, for example, by extrusion or spinning, or cut or slit from a preformed sheet. The strips should be flexible or resiliently deformable. In order to maximize surface area while still maintaining sufficient physical integrity, the strips should be elongated and relatively thin, typically 3-8 cm (1.181-3.15 inches) long, and about 1 mm (about 0.03937 inch) thick by about 1 mm (about 0.03937 inch) wide. The strips are held together by a wire core, i.e., similar to a conventional twisted wire bottle brush construction.

Yet another aspect of the present disclosure provides an apparatus for extracting carbon dioxide ($CO_2$) from ambient air that can be factory-built and shipped essentially fully functional to a site. More particularly, the present invention provides a fully contained air-capture device scaled to fit to a standard 40-foot shipping container, or on a flatbed truck, or on wheeled dollies for overland, i.e. highway delivery. Providing an essentially fully functional factory-built system scaled for conventional shipping will provide economies of scale permitting wide-spread adoption of air capture devices so that they may be deployed adjacent a facility where the extracted $CO_2$ may be used in a secondary process as described, for example, in our co-pending U.S. patent application Ser. No. 12/389,213. Alternatively, a large number of air capture devices may be assembled in an air-capture park and, if desired, plumbed together to permit efficient handling of sorbent washes, concentration of $CO_2$ product, etc., e.g. as described in our PCT Application Serial No. PCT/US08/60672. The extraction of carbon dioxide from the air may be accomplished by using one of a number of methods such as disclosed in our aforesaid PCT Application Nos. PCT/US05/29979, PCT/US06/02938 and PCT/US07/80229, as well as other extraction processes described in the literature and patent art. See also the co-pending U.S. patent application Ser. No. 12/389,213, commonly owned and incorporated by reference herein.

Another aspect of the present disclosure is concerned with technical improvements and alternative designs for previously disclosed devices, processes and methods designed to capture carbon dioxide from the atmosphere comprising a $CO_2$ selective sorbent that can be regenerated by providing water, humidity or low grade steam with temperatures that can be well below 100° C. (212° F.).

The present aspect improves on the prior art by providing a carbon dioxide ($CO_2$) capture method comprising transferring moisture from one charge of water-swing based $CO_2$ sorbent to another charge, by causing water vapor to flow from the first chamber filled with partially or fully $CO_2$ depleted sorbent to the second chamber filled with partially or fully $CO_2$ loaded sorbent, wherein the existing water vapor pressure gradient drives a spontaneous flow from the first to second chamber until a substantial equilibrium between the chambers is reached, whereupon the remaining water vapor is compelled to flow from the first chamber to the second chamber by a mechanical means such as a pump.

Another aspect of the present invention provides an apparatus including a plurality of chambers connected by a network of pipes and valves, wherein any of the plurality of chambers may function as the first chamber in the method described herein for transferring water or water vapor from a first chamber containing a carbon dioxide depleted sorbent to a second chamber containing a carbon dioxide saturated sorbent.

The disclosure provides a method for regenerating a water-swing based carbon dioxide sorbent as described above, wherein water is added to the second chamber prior to the transfer of water vapor, effectively expelling air from the second chamber. Alternatively, this aspect of the present disclosure provides a method for recovering carbon dioxide from a water-swing based sorbent, comprises immersing the carbon dioxide saturated sorbent contained in a first chamber in water, releasing the carbon dioxide from the sorbent, and pumping the water containing carbon dioxide to a second chamber containing sorbent saturated with carbon dioxide.

Further features and advantages of the present invention will be seen from the following detailed description, taken in conjunction with the accompanying drawings, wherein.

In the following description, reference is made to the accompanying drawings, which form a part hereof, and in which is shown, by way of illustration, various embodiments of the present disclosure. It is understood that other embodiments may be utilized and changes may be made without departing from the scope of the present invention.

Figure 1:
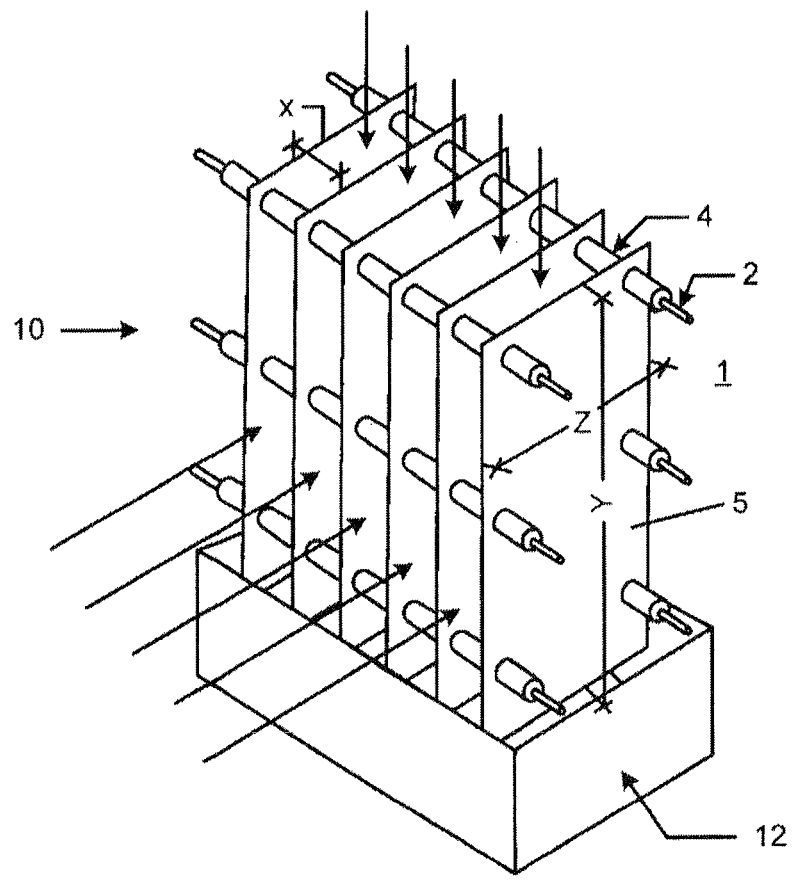
FIG. 1 illustrates a $CO_2$ extractor as described in a commonly-owned, co-pending application.

Co-pending U.S. application Ser. No. 11/209,962, filed Aug. 22, 2005, U.S. Publication No. U.S. 2006-051274-A1, commonly owned and incorporated herein by reference, discloses an air capture device designed to remove $CO_2$ from air flow having a low-pressure gradient. Referring to FIG. 1, the air capture device includes an air scrubber unit that consists of a wind collector 10 having a plurality of sheets 5 covered with a downward flowing sorbent, individual pairs of sheets forming a lamella, the lamella being defined as two of the plurality of sheets and the thin airspace bound between them, and a liquid sump 12. The two sheets forming the individual lamellae are preferably separated by spacers 4 laced between the sheets on thru-rods 2 supported by a rigid frame 1. Alternatively, the sheets may be supported in spaced relation by other devices, such as for example a plurality of spacers adhered to the sheets without the use of a thru-rod.

A liquid sorbent material is applied to the sheets using, e.g., spray nozzles or liquid extrusion, for example from corrugated tubing (not shown) fed from a header, and flows down the sheets, while the airflow passes between the thin airspace between the sheets. The contact between the air and the liquid sorbent material causes a chemical reaction that removes $CO_2$. Alternatively, a liquid sorbent could be applied to the sheet vertical surfaces near the top, the sorbent is drawn downward by gravity over the surfaces to cover entire area of the sheets.

The basic unit of the wind collector is a single lamella which is a thin air space bounded by two liquid sorbent covered sheets. In the design shown in FIG. 1, the sheets are flat. The sheets may also be curved, but it is preferred that the path of the air passing through the lamellae is largely uninhibited, i.e. the sheets curve in the direction normal to the wind flow. This design feature minimizes the amount of pressure drop in the system. Each air scrubber device includes a means of distributing the liquid sorbent on the sheets of the lamella and recapturing the spent sorbent.

The pressure gradients for moving the airflow across the lamella are such that they could be generated by natural airflows, e.g. wind, or engineered updrafts from thermal gradients. High wind speeds are not ideal as higher speeds lead to higher rates of energy dissipation. Slow airflow speeds maximize air contact time with the liquid sorbent material on the lamella while minimizing the loss of kinetic energy in the system. Thus, airflow velocities through the scrubber unit may range from virtually stagnant to a few tens of meters per second. A preferred range would be from 0.5 to 15 m/s (1.64 to 49.21 feet/second) an optimal range for wind driven systems ranges from 1 to 6 m/sec (3.281 to 19.69 feet/second). Pressure drops across the unit range from nearly zero to a few hundreds of Pascal, a preferred range is from 1 to 30 Pa and an optimal range may be from 3 to 20 Pa. However, fans either with or without ductwork to guide the air and convection also could be used to move the air.

Practically, the flow speed of the airflow through the collector may be a substantial fraction of the typical wind speed. The choice of collector geometries may reduce the flow speed somewhat, but those enhancements typically will be factors of two, as opposed to orders of magnitude.

Our previous disclosure provided several exemplary designs for lamella geometries, including the following:

Flat rectangular sheets or plates that are aligned parallel to each other, as shown in FIG. 1.

Corrugated sheets that are lined up parallel to each other, with surfaces straight in the direction of air flow.

Flat disks rotating around a center axis with the air flowing at right angle to the axis of rotation. Liquid sorbent could be applied by dipping the disks into a liquid sorbent sump near the bottom of the circular motion. The liquid sorbent in the sump may only cover the outer rim of the disks or reach all the way to the axle. Alternatively liquid sorbent may be injected onto the rim by liquid wetting near the axle and flowing around the disk due to gravity and rotary motion.

Concentric tubes or similar shapes where air is blown along the tube axis. Such tubes could be arranged vertically for counterflow designs with liquid sorbent wetting initiated at the upper rim, or nearly arranged horizontally with liquid sorbent entering at one end and one point and distributed through a slow rotating motion of the tubes.

While the air scrubbing units described in afore-mentioned commonly owned '962 application have been demonstrated to efficiently remove ambient $CO_2$, the requirement to continuously wet the sheets with a liquid sorbent adds to the cost and complexity of the system.

One aspect of the present disclosure provides an improvement over the laminar flow air collector such as described in our aforesaid '962 application by eliminating the need for liquid sorbent, and using in place thereof solid materials to absorb $CO_2$ and that can then be induced to release the absorbed $CO_2$.

Figure 2:
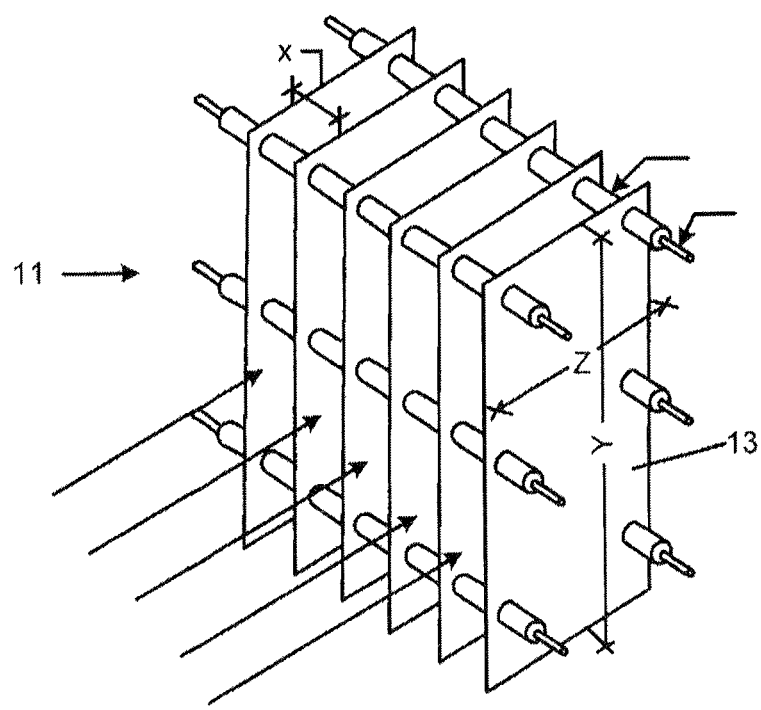
FIG. 2 is a schematic view of a $CO_2$ extractor in accordance with a first embodiment of the present invention.
Figure 3:
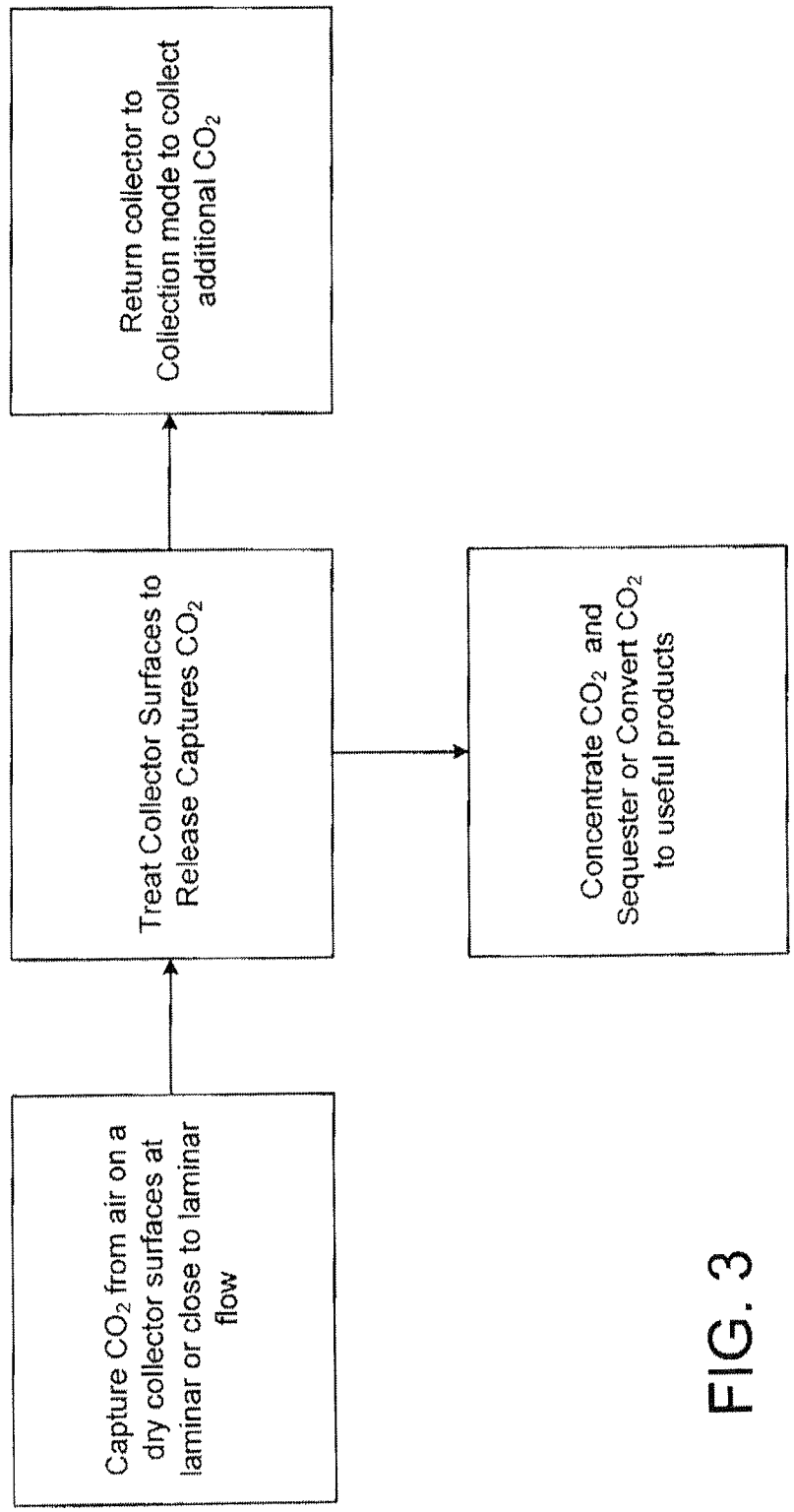
FIG. 3 is a flow diagram illustrating the overall process in accordance with a first embodiment of the present invention.

Referring to FIGS. 2 and 3, the present disclosure provides a $CO_2$ capture device comprising a laminar or near laminar air scrubber in which the laminar structure 11 is formed, at least in part, of solid functionalized anion exchange materials. The laminar structure 11 may be formed from sheets 13 of solid anion exchange material such as fictionalized polystyrene or the like, or the laminar structure may comprise sheets of inert substrate material supporting solid anion exchange material. One commercially available material useful in air capture according to our disclosure is an anion exchange membrane material available from Snowpure, LLC, San Clemente, Calif. The manufacturer describes this material as compromising crushed anionic exchange resin mixed in a polypropylene matrix and extruded as a sheet according to the teachings of U.S. Pat. Nos. 6,503,957 and 6,716,888. The solid anion exchange polymer also may be formed into cells or coated on surfaces of a support material formed into cells that provides certain critical capture performance requirements as will be described below.

Alternatively, the solid $CO_2$ sorbent may comprise materials such as Zeolite, activated carbon, activated alumina, solid amines and other materials capable of physical or chemical absorption of $CO_2$ molecules. In yet other embodiments, the solid materials for absorbing $CO_2$ may comprise solid ion-conductive materials formed, for example, according to the teachings of our co-pending U.S. patent application Ser. No. 12/389,216, filed Feb. 19, 2009.

Referring to FIGS. 4A-4F, the solid surface sorbent materials may take various forms. These may include sheets 20 formed, for example, of anion exchange membrane material, such as the material available from Snowpure, held in a frame 22. Alternatively, the $CO_2$ absorbing layer may be coated or "painted" on a solid substrate material which may be self supporting or supported on a frame, or formed as a film covering a substrate material. In one embodiment, the collector plates may comprise smooth essentially parallel plates. In another embodiment, the surfaces of the plates may not be entirely flat, but may follow straight lines or nearly straight lines in the direction of airflow. Alternative embodiments include constructions where the surfaces are corrugated, or comprise a plurality of tubes 24 (FIG. 4B), angular shapes 26 akin to harmonica mouth pieces (FIG. 4C), or any combination thereof, but with the airflow still following a substantially straight line. In yet another embodiment, the surfaces may be formed on a monolith structure such as a honeycomb or lattice structure having openings in straight lines crossing a monoliths, or net, woven or non-woven material coated with $CO_2$ absorbing materials, or holding $CO_2$ absorbing materials.

Figure 4A:
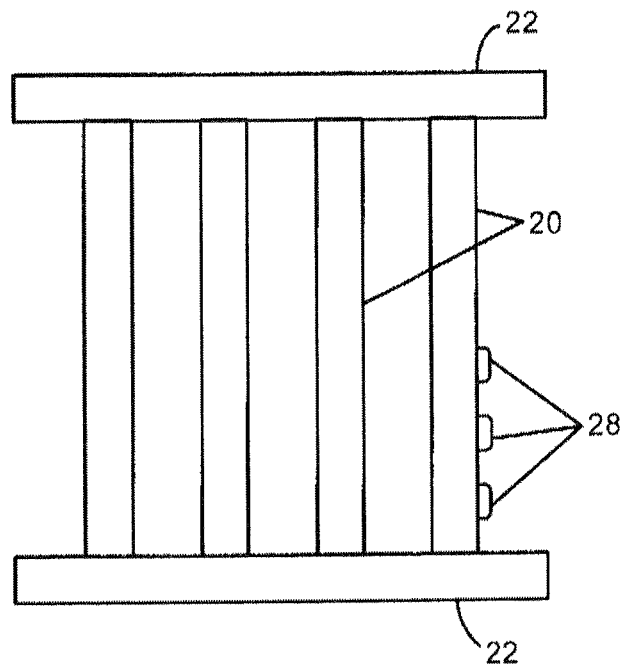
FIGS. 4A-4F are side elevation views illustrating embodiments of laminar collectors in accordance with the present invention.
Figure 4B:
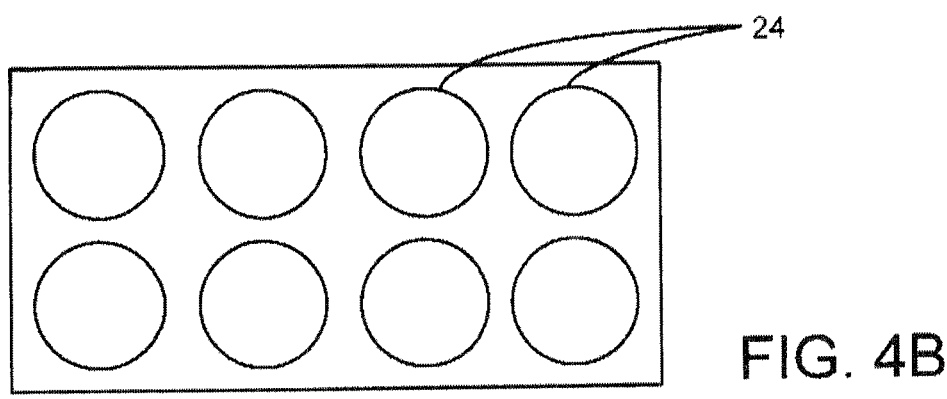

If desired, the collector surfaces may be slightly roughened in a regular or random matter in order to increase total active surface area without materially affecting laminar flow or substantially increasing resistance. For example, as seen in FIG. 4A the collector surface may include various bumps 28, or may alternatively include various grooves, dimples, fibrous and abrasive areas or other dendrites or other small structures that are smaller than the flow channels and smaller than the diffusion boundary layer thickness, but are large enough to contribute to total surface area. While the roughing may increase Reynolds numbers the increase in total active surface area more than makes up for the added resistance. Preferably, the increase in Reynolds number is kept small, optimally less than about 100.

Alternatively, surface roughening may be accomplished by sand blasting, grinding or other mechanical means, or by etching including chemical etching or high energy etching, e.g., by ion bombardment. Surface roughening may also be accomplished by foaming the sorbent material either throughout the body of the structure or on the surface of the material. In yet another alternative, the solid material collector surfaces may be formed of foam or foam like materials. In another embodiment of the disclosure, the solid collector surfaces may be formed of porous materials such as activated carbon.

Figure 4C:
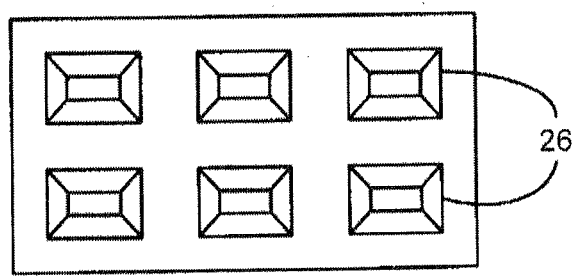
Figure 4D:
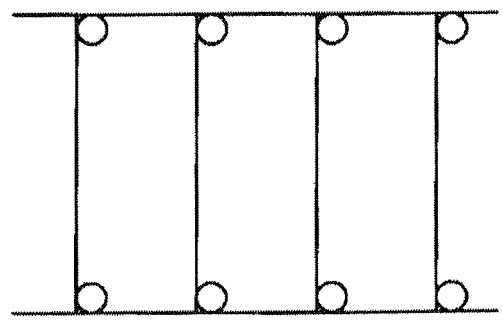
Figure 4E:
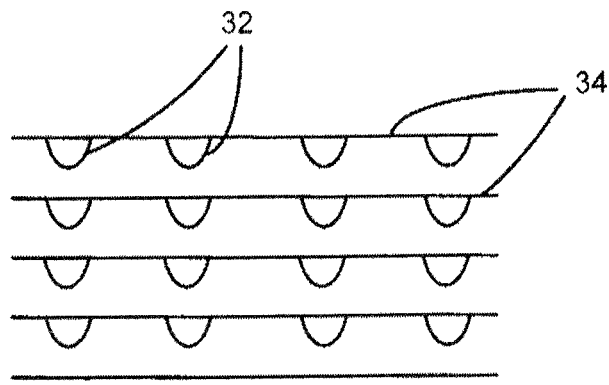
Figure 4F:
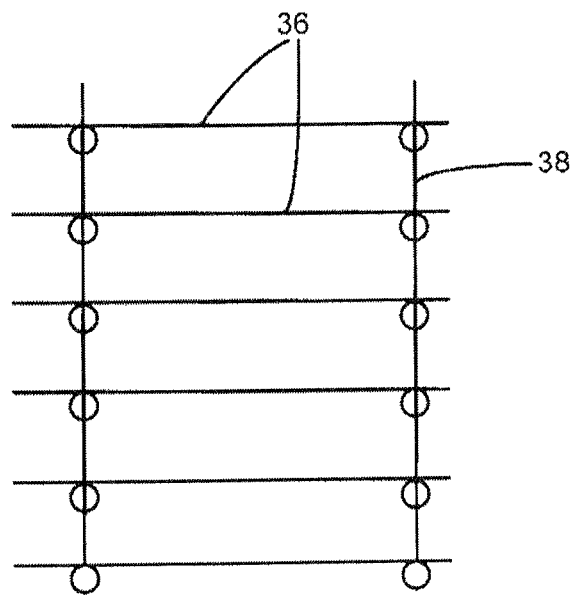

The surface may be formed with various geometric shapes 26 to increase the surface area exposed to the air stream (see FIG. 4C). The solid collector surfaces may also be formed of coated foil or corrugated foil 34 or other thin films held taut by wires 30 or supported by taut wires or netting (FIG. 4D). The solid collector surfaces may comprise coated or corrugated foils 34 that are stacked and kept apart by spacers or by bumps 32 on surfaces of the foils (FIG. 4E). Alternatively, the collector plates 36 are formed of thin plates that are held together by lines or wires 38 similar to a Venetian blind (FIG. 4F). The wires holding the plates may run parallel to airflow so as to minimize turbulence.

Many other structural and functional features and operating parameters may be incorporated into the scrubber. For example, it may be desirable to configure the collector for horizontal airflow. For most of the designs disclosed herein, the average spacing between individual sheets of the collector should be in the range of 0.3 cm to 3 cm (0.1181 inches to 1.181 inches), and the flow path through the collector should be in the range of 0.1 m to 3 m (0.3281 ft to 9.843 ft).

The collector may also be designed to operate at a specific airflow speed. For example the airflow may be in the range of about 1 m/s to 20 m/s (about 3.281 ft/s to 65.62 ft/s), or preferably between about 1 m/s and 10 m/s (about 3.281 ft/s to 32.81 ft/s), and more preferably between about 0.1 m/s and 2 m/s (0.3281 ft/s to 6.562 ft/s). Flow straighteners may be placed at the inlet and outlet of the collector or at transition points within the collector to minimize losses from misalignment between the surfaces and the instantaneous wind field air flows. Alternatively, the scrubber may include a control device for either passively or actively steering the collector surfaces or the collector itself so that the surfaces of the collector are optimally aligned with the airflow.

The laminar flow apparatus of the present disclosure may utilize a pressure drop across the collector to induce a flow across the collection surfaces. The pressure drop may be created by stagnation of flow on the upwind side of the scrubber; by a Bernoulli type pressure reduction induced by air flowing at right angle to the flowline entering the scrubber; by thermal convection; by a mechanical input, including but not limited to fans; by placing the apparatus into the flow of a cooling tower at any location in the flow; by placing the apparatus into the flow of any other type of convection tower or chimney; or by placing the scrubber on a hill side that induces thermal convection or katabatic winds.

The collector may be organized into cylindrical, elliptical, spherical shapes through which air can pass, or as a plurality of spaced flat plates, e.g., circular disks that form a vertical disc stack. The solid sorbent may be regenerated by a washing fluid that removes the absorbed $CO_2$ e.g., to alkaline solutions. Alternatively, or in combination, the solid sorbent is heated to drive the release of $CO_2$, either directly into the surrounding volume or into a washing fluid.

The next step of the process involves separating the captured $CO_2$ from the collector. Typically, where ion exchange materials are used in the collector, the $CO_2$ may be removed by washing the collector plates with water (in the form of water, steam or humid air), and then treating the wash solution to recover the carbon dioxide, for example, according to the teachings of our earlier U.S. patent application Ser. No. 11/209,962, filed Aug. 22, 2005. Alternatively, the $CO_2$ may be concentrated and compressed and used as a feedstock, for example, for synthetic fuel production or to enhance plant growth, to carbonate beverages or injected into the ground to enhance oil recovery, or for storage, or injected into the ocean.

The air surrounding the sorbent may be evacuated from the chamber in order to avoid the admixture of air with released $CO_2$ in connection with either of the above methods for regenerating the sorbent. Once the solid sorbent releases the $CO_2$, the concentrated $CO_2$ remaining in the chamber is evacuated. Where the $CO_2$ is mixed with water vapor, as when a humidity swing is used, the water vapor may be separated from the $CO_2$ by reducing pressure using either a cold trap or some other cooling device such as a heat exchanger, or by direct compression. The cold trap may be used to compress and liquefy or freeze the $CO_2$.

Another potential method for regeneration of the solid sorbent is to bring the solid sorbent in contact with a secondary sorbent that reduces the $CO_2$ partial pressure in the system. The secondary sorbent in this embodiment preferably is a liquid.

The regeneration of the sorbent may take place at the location of the $CO_2$ collection, or the scrubber unit may be transported to another location for efficient removal and/or sequestration of the captured $CO_2$.

Yet other separation and sequestration treatments are possible including those described in commonly-owned, copending U.S. patent application Ser. No. 11/209,962, filed Aug. 22, 2005; Ser. No. 11/346,522, filed Feb. 2, 2006, Ser. No. 11/683,824, filed Mar. 8, 2007; and Ser. No. 11/866,326, filed Oct. 2, 2007, the contents of which are incorporated herein by reference.

Another aspect of the present disclosure provides solid ion exchange materials such as described above and in our aforementioned co-pending applications, wherein the ion exchange materials are formed or cut into thin strips, and held together around a core in the form of a bottlebrush-type structure.

In co-pending U.S. application Ser. No. 11/683,824, filed Mar. 8, 2007, U.S. Publication No. U.S.-2007-0217982-A1, assigned to a common assignee and incorporated by reference herein, there is described an air capture device that utilizes a solid functionalized anion exchange material that is formed to provide a relatively large surface area which allows for air flow with minimum resistance. The solid anion exchange material may be formed from sheets of anion exchange material such as fictionalized polystyrene or the like, or comprise sheets of inert substrate material coated with anion exchange material. In a preferred embodiment of our prior disclosure, the anion exchange material comprises "noodle-like" 1 mm (0.03937 inch) thick by 1 mm (0.03937 inch) wide strands formed by slitting commercially available anion exchange membrane as described supra. The solid anion exchange polymer also may be formed into cells or the like. See also co-pending application Ser. No. 12/389,213, filed Feb. 19, 2008, for alternative processes for production of solid $CO_2$ sorbent materials.

Figure 5:
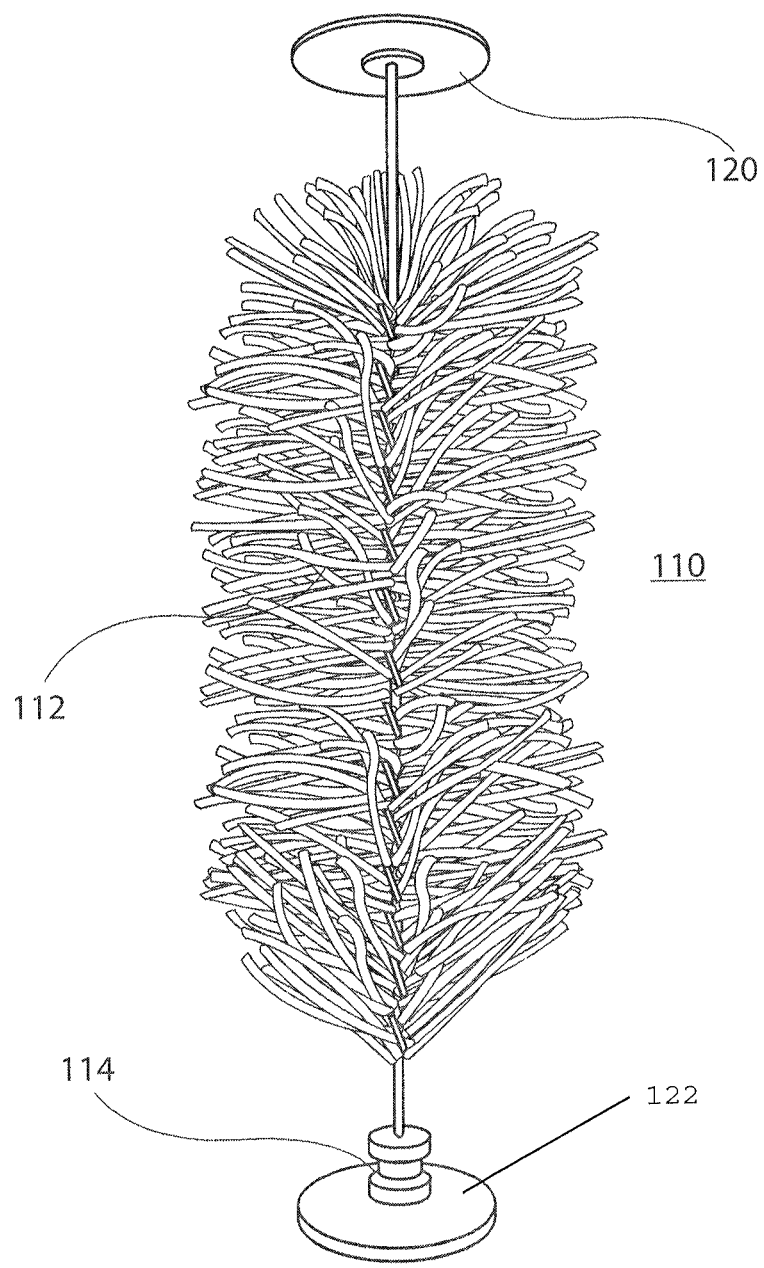
FIG. 5 is a drawing depicting a bottle brush design $CO_2$ air capture device made in accordance with another aspect of the present invention.
Figure 6:
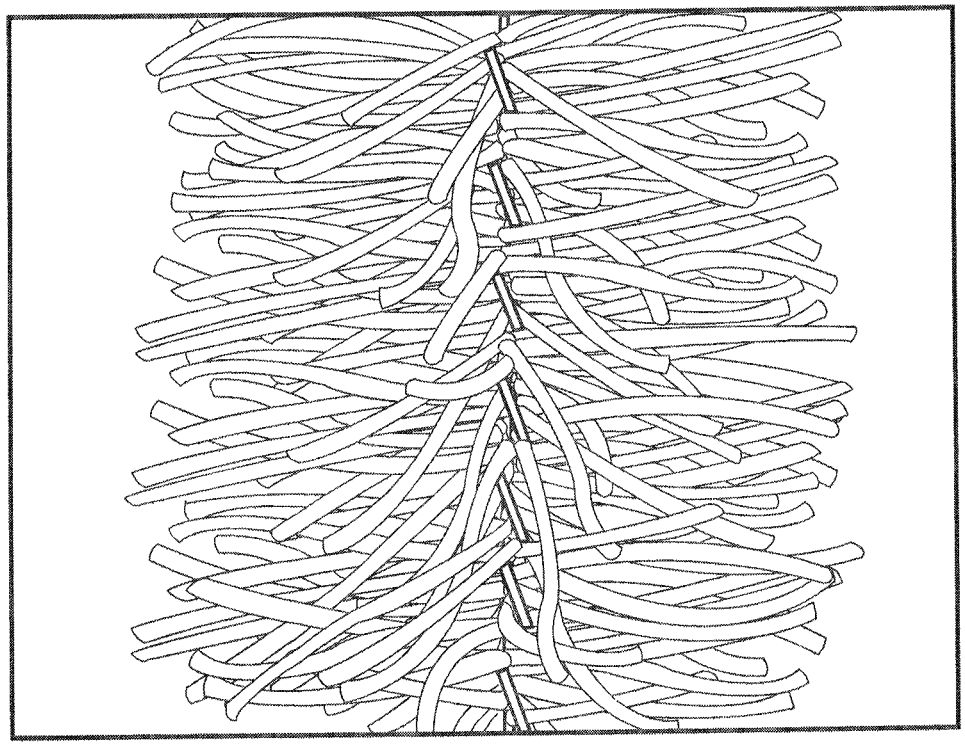
FIG. 6 is a detailed view showing details of the bottle brush air capture device of FIG. 5.
Figure 7:
FIG. 7 is a drawing depicting the bottle brush air capture device of FIG. 5 deployed within a transparent tube.

FIGS. 5-7 show a bottlebrush shaped $CO_2$ air capture element 110 made in accordance with the present disclosure. The air capture element 110 comprises a plurality of elongated strips 112 of sorbent material such as solid ion exchange materials such as available from Snowpure, LLC, cut into 1 mm (0.03937 in) thick by 1 mm (0.03937 in) wide strands, and formed into a "pine-brush" or bottlebrush shaped collector held together and extending from about 5.0 cm (about 1.969 in) from a twisted wire core 114. The brushes could, of course, be sealed to any convenient size. The distal ends of the wire core 114 may be mounted to fixtures 120, 122 which permits the air capsule element 110 to be stored in place, or assembled to another structure as will be described below.

Attaching the sorbent "strip" to a wire core, i.e. in the form of a bottle brush, permits low cost manufacturing using existing manufacturing equipment similar to that used in making conventional bottle-brushes.

The bottlebrush shaped air capture elements 110, themselves can then be incorporated as basic collection elements of a collector assembly. Airflow can be directed axially (along the elongate wire core 114) or transverse to the wire core 114. Alternatively, the flow may be in a random direction relative to the elongate axis of the bottlebrush. For example, consider the case of a design where a plurality of bottle-brushes are radially aligned in a vertical cylindrically shaped assembly. In that case the air can enter and penetrate the assembly at virtually any angle. It also is possible for air capture element to be laid on its side, in which case there may be less constraint with regard to the flow directions.

A feature of the bottle-brush design of the present disclosure is that the flexible strands of sorbent material can be folded together and thereby reduce the volume of the basic collector unit, i.e. so that an air capture element 110 may be drawn to inside a smaller diameter tube. This feature and advantage is illustrated in FIG. 7 which shows a bottlebrush-shaped air capture element 110 being drawn into a tube, that has a substantially smaller diameter than the unfolded "needles." As a result the volume required in the treatment process for removing and concentrating the captured $CO_2$, and for regenerating elements, as will be discussed below, can be substantially smaller than the volume occupied during air capture.

Figure 8:
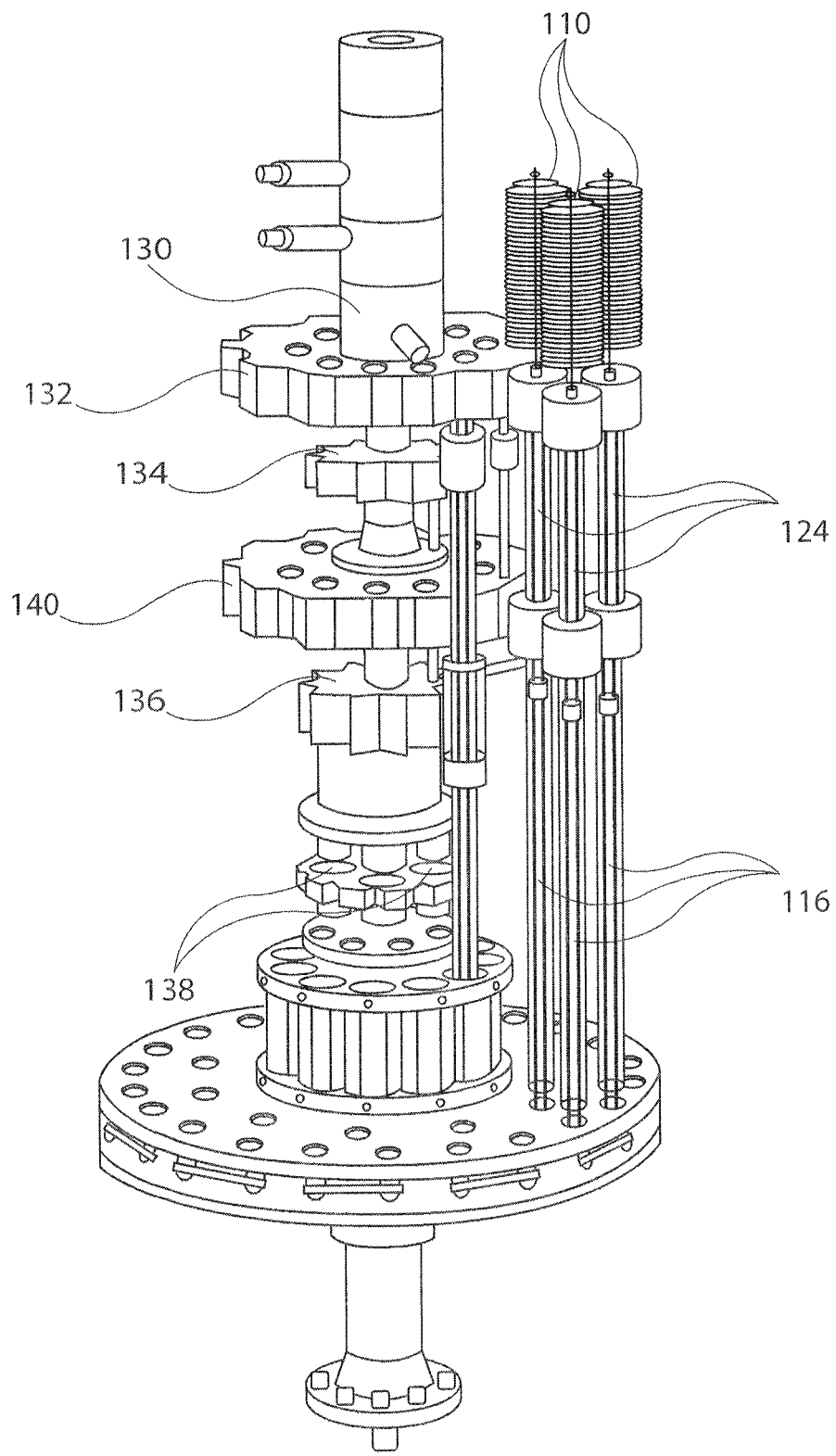
FIG. 8 is a perspective schematic view of a $CO_2$ capture system incorporating bottle brush $CO_2$ capture devices in accordance with one embodiment of the present invention.

Referring to FIG. 8, in a preferred embodiment of the present disclosure, the air capture device comprises a plurality of sets of air capture elements 110 each provided with a threaded rod 116 attached to the distal end of the wire core 114. FIG. 8 shows the threaded rod in connection with one possible embodiment. The threaded rod sits within a guide nut (not shown) and is turned by a motor (not shown) to extend and retract the air capture element 110. The motor turns the rod in a first direction to retract the portion of the air capture element with elongated strips 112 into $CO_2$ cylinder 124, and in a second (opposite) direction to extend the air capture element once the $CO_2$ has been entrained in the system and the sorbent strips have been regenerated. Optionally, the motor may be configured to spin the guide nut around the threaded rod.

The assembly shown in FIG. 8 includes eleven sets of three brushes. Each set of air capture elements may be extended or retracted individually. This allows the system to treat some of the air capture elements i.e. to remove and concentrate captured $CO_2$ and regenerate the elements, while other of the air capture elements are deployed to remove additional $CO_2$ from the atmosphere.

The distal end of each air capture element 110 carries a cap for sealing the $CO_2$ cylinder 124. The cap and/or the top of the cylinder may further include an o-ring or other mechanism to provide a seal when the air capture element is fully retracted.

Once the sorbent strips are folded and pulled into the cylinder 124, the cylinder is sealed with the cap, and the captured $CO_2$ is released from the sorbent strips, and the released $CO_2$ concentrated by any one of several methods described in our previous patent applications. For instance, the $CO_2$ may be released by humidity swing, thermal swing, vacuum pressure, or by using a wash. The regenerated sorbent strips are then be deployed to remove additional $CO_2$ from the atmosphere FIG. 8 shows an exemplary embodiment, wherein the elongated sorbent strips 112 are washed with a carbonate wash solution, such as sodium carbonate, and then release $CO_2$ inside the cylinder 124. The carbonate wash solution preferably is at or near a pH of 11.8 or higher. This step regenerates the sorbent and captures the $CO_2$ in the effluent in the form of bicarbonate ions. Referring to FIG. 8, the wash solution is contained in a wash reservoir 130 located above the cylinders 124. The wash reservoir 130 is connected to each of the sets of air capture elements by the upper manifold 132. The upper valve 134 controls the flow of wash solution to a cylinder 124, where the wash solution enters at the bottom of a first cylinder in a set. After filling the first cylinder, the wash solution cascades to the next cylinder of the set, which are connected in series, filling again from the bottom. After passing through each of the cylinders in a set, the wash solution passes through lower valve 136, at which point the resulting carbonate/bicarbonate solution is pumped upwards by one of pumps 138 through the lower manifold 140 to be fed into the next set of cylinders in turn.

The system preferably is controlled to produce a bicarbonate effluent, such as sodium bicarbonate, at or near a pH of 8.3. According to the embodiment of FIG. 8, this is efficiently done by flowing the carbonate solution through several air capture elements in series, wherein each successive air capture element contains a greater concentration of $CO_2$. The effluent is then stored in the brine tank (not shown).

The assembly of FIG. 8 is designed such that some of the air capture elements remain in the air stream while other air capture elements are being regenerated by the wash solution. Each of the sets of air capture elements may move independently of one another through the use of several clutch mechanisms. Additionally, the upper and lower valves 134, 136 may be controlled to manipulate the order in which the wash solution sees each set of elements.

The bicarbonate solution may be further processed to concentrate the $CO_2$ by using one of a number of processes as disclosed in our previous applications such as electrodialysis, thermal swing, secondary sorbents, or other processes. The assembly of FIG. 8 is configured to deliver the bicarbonate solution to an electrodialysis cell.

Other configurations apart from the one shown in FIG. 8 are also possible. This includes different geometric arrangements of the air capture elements. By way of example, such arrangements might include: rows of air capture elements forming a box; air capture elements formed as circular rings; air capture elements arranged in a circular formation, with the air capture elements extending vertically, horizontally outward, or both; a plurality of bottle brushes may be formed into a spiral column; a plurality of bottle brush elements placed together in a air flow plenum; or a plurality of bottle brushes strung together along a moving track.

Figure 9:
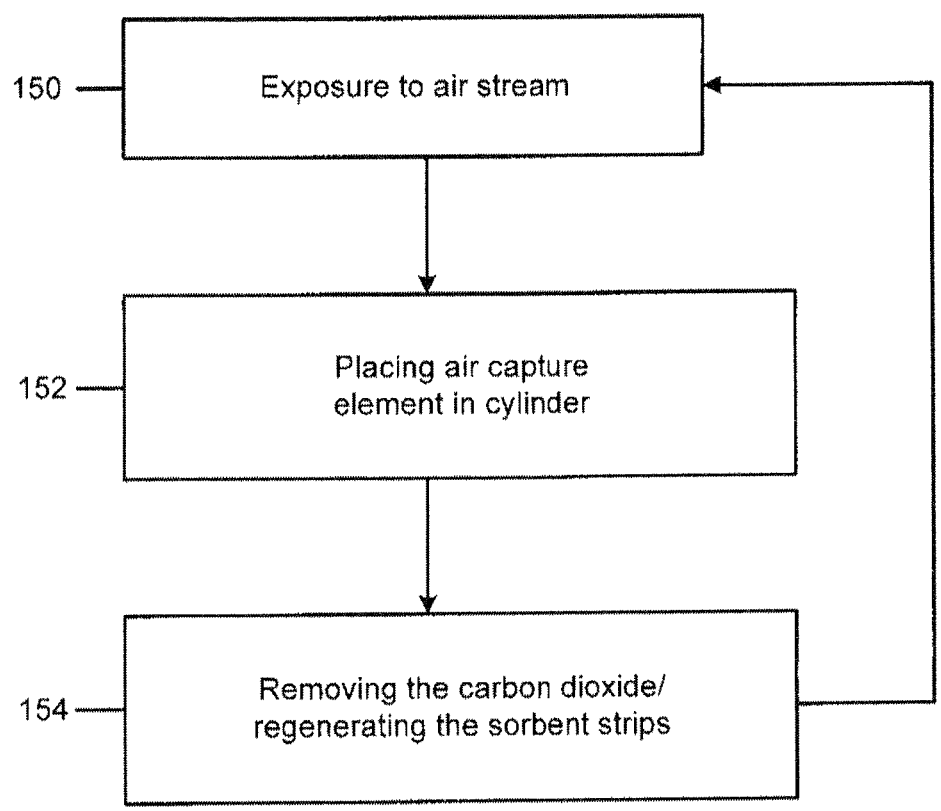
FIG. 9 is a block flow diagram illustrating a process of using a bottle brush shaped $CO_2$ air capture device in accordance with the present invention.

Another aspect of the present disclosure provides a method for extracting a contaminant from a gas stream, specifically the removal of $CO_2$ from the air or from a flue stream. FIG. 9 is a block diagram showing this method, wherein a structure is provided including a plurality of air capture elements and cylinders as described above. First the air is exposed to the air or flue stream in an air capture station 150. $CO_2$ molecules are captured by the sorbent strips of the air capture elements. When the air capture elements are at least partially saturated with $CO_2$, the air capture elements are drawn into the cylinder, in a $CO_2$ concentration and air capture element regeneration station 152 folding the sorbent strips. The sorbent strips are then treated to extract the captured $CO_2$ and to regenerate the sorbent strips. This may be accomplished by one of the methods mentioned above, such as for example, drawing off the captured $CO_2$ by applying a vacuum pressure to the cylinder; employing a thermal swing; employing a humidity swing; or washing the air capture strips in a sodium carbonate solution or other secondary sorbent. The $CO_2$ is then concentrated and the secondary sorbent reclaimed in a concentration/reclamation station 154. When the air capture strips have been at least substantially regenerated, the air capture element is rejected from the cylinder where the air capture strips deploy to their original geometry, and the above steps are repeated.

Figure 10:
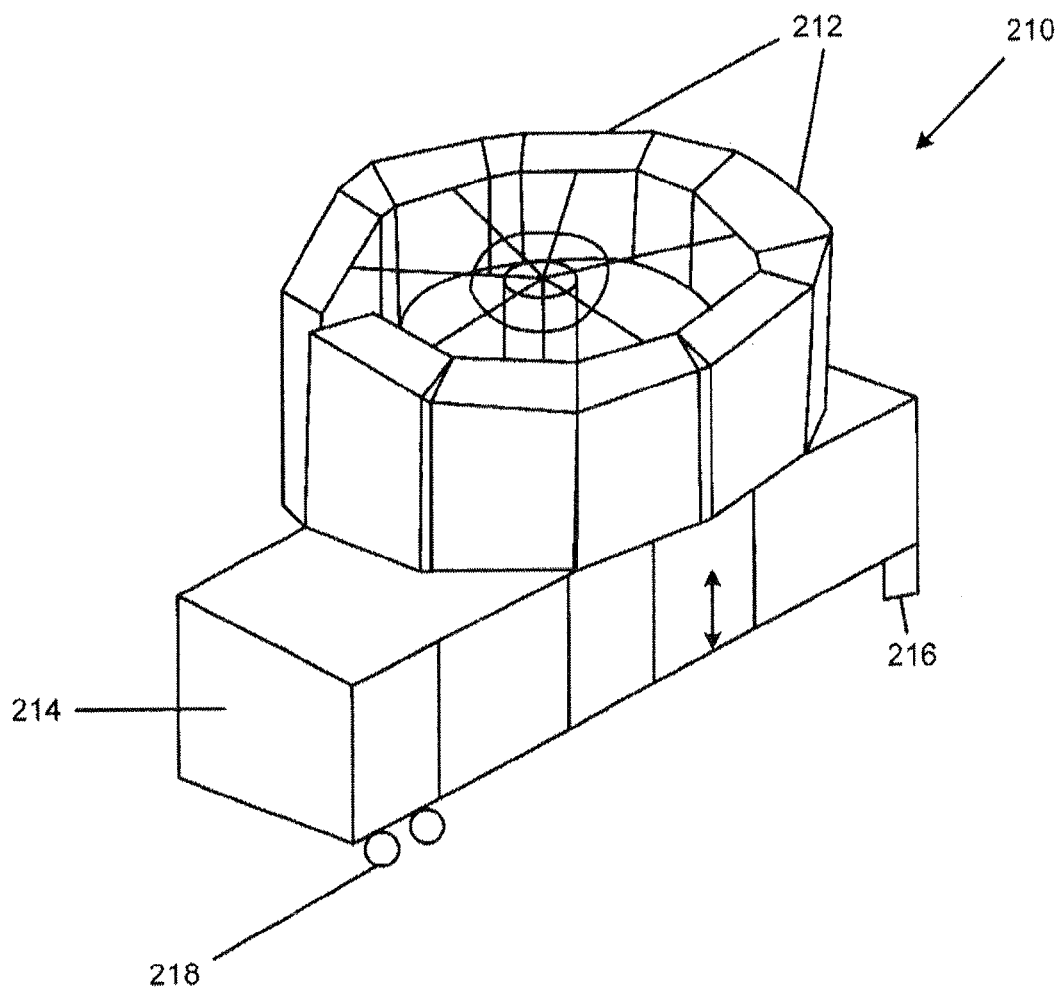
FIG. 10 is a perspective view of a fully integrated air-capture device in accordance with another aspect of the present disclosure.
Figure 11:
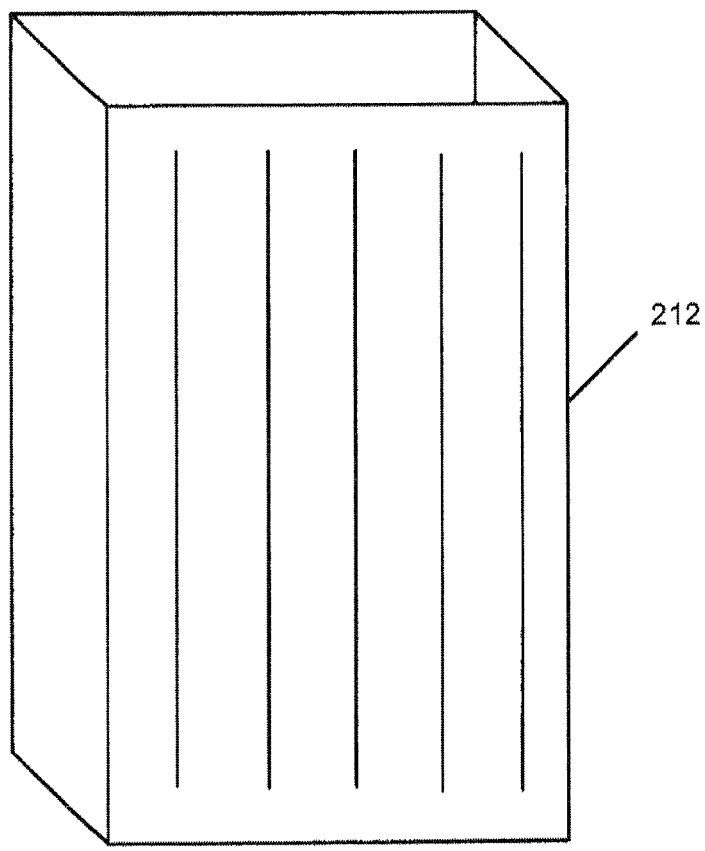
FIG. 11 is a perspective view showing details of an air-exchange unit of FIG. 10.

In another aspect of the present disclosure, carbon dioxide ($CO_2$) is extracted from ambient air using a conventional $CO_2$ extraction method or one of the improved $CO_2$ extraction methods disclosed supra or in commonly-owned PCT applications PCT/US05/29979, PCT/US06/029238, and PCT/US07/802,229, each of which is incorporated by reference herein. As shown in FIGS. 10 and 11, the present disclosure provides a factory-built system 210 comprising a plurality of air collector elements 212 containing a $CO_2$ sorbent mounted or deployed on a base 214 which includes the necessary equipment for concentrating the $CO_2$ removed from the air and for regenerating the sorbent.

In the illustrated example, the system comprises eight collector elements 212; however, the system may comprise fewer or more than eight collector elements. The collector elements are plumbed and valved so that selected elements may be actively collecting $CO_2$ while other elements are being regenerated, e.g., in accordance with other aspects of the present disclosure. Base 214 is sized to fit within a standard 40 ft shipping container, or on a flatbed trailer so that the system may be trucked to a site, and lifted off the trailer and leveled on pylons 216. Alternatively, base 214 may be supplied with wheels or a wheeled carriage 218 so that the system may be towed to a site, and jacked and leveled at the site.

Designing the system so that it may be mass produced in a factory and shipped essentially functionally complete will significantly reduce costs of the system just as in the case of factory built housing has reduced the cost of housing.

Base 214 includes the several elements needed to concentrate the $CO_2$ and regenerate the sorbent.

Figure 12:
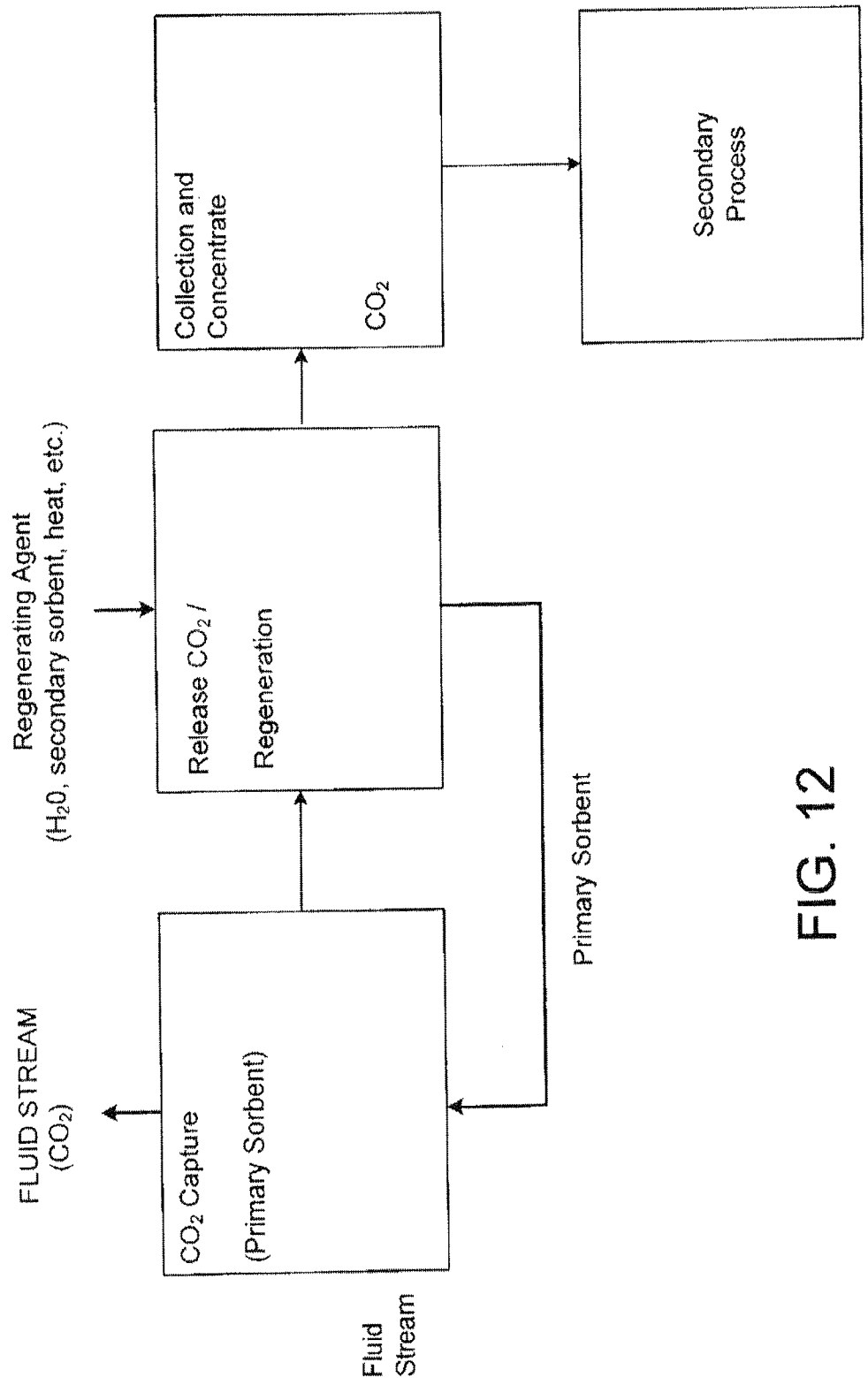
FIG. 12 is a schematic showing a generalized system for capturing $CO_2$ in accordance with one aspect of the present disclosure.

Our afore-mentioned commonly owned applications disclose several potential primary sorbents that may be used to capture and remove $CO_2$ from the air. In one approach to $CO_2$ capture, illustrated in FIG. 12, the sorbent is a strong base ion exchange resin that has a strong humidity function, that is to say, an ion exchange resin having the ability to take up $CO_2$ as humidity is decreased, and give up $CO_2$ as humidity is increased. Such resins may be regenerated by contact with water, humid air, or pulses of steam. In this approach the $CO_2$ is returned to a gaseous phase in a more concentrated form, and no liquid media are brought in contact with the collector material.

Other primary sorbents may be regenerated by a secondary sorbent such as weak liquid amine. This amine must be capable of pulling the $CO_2$ content of gas mixture down so that the $CO_2$ partial pressure drops to about e.g., 20 to 30 mbar. Thus it can be far weaker sorbent than the primary sorbent and this allows the use of very weak amines.

Still other sorbent materials may be regenerated by the application of heat (utilizing a thermal swing), or vacuum pressure.

Figure 13A:
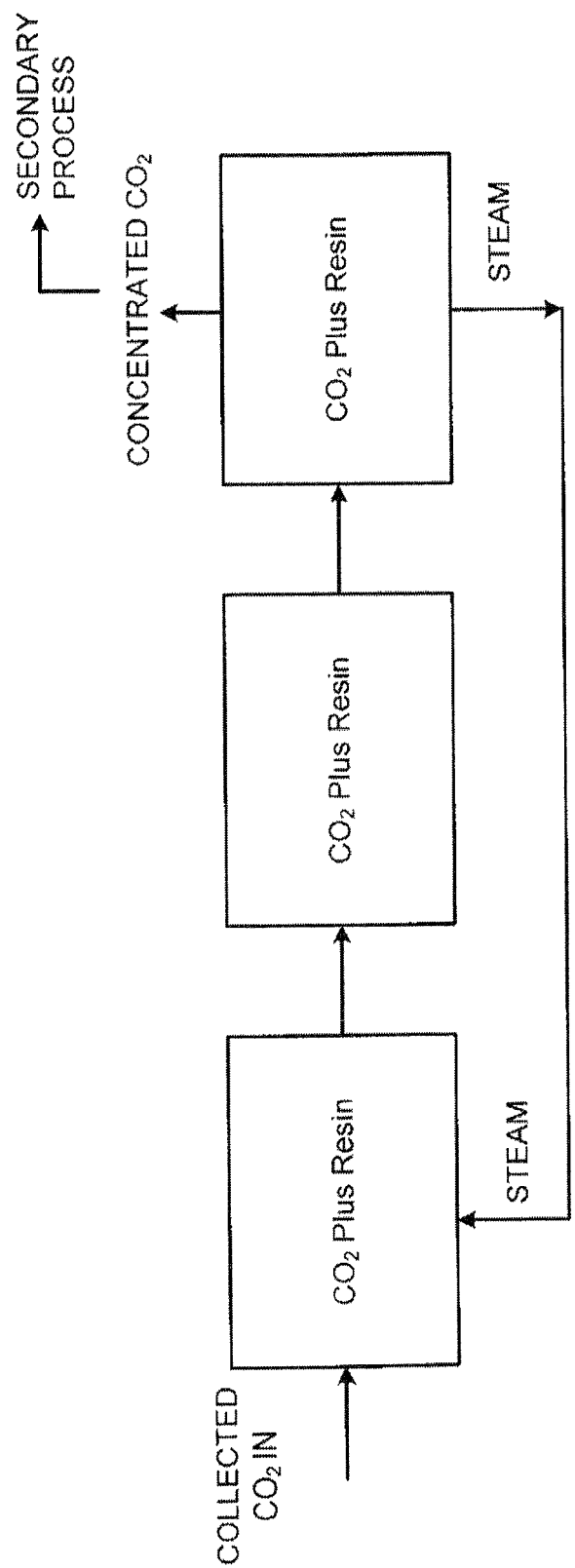
FIG. 13A is a schematic showing an ion exchange process for capturing $CO_2$ in accordance with another aspect of the present disclosure.
Figure 13B:
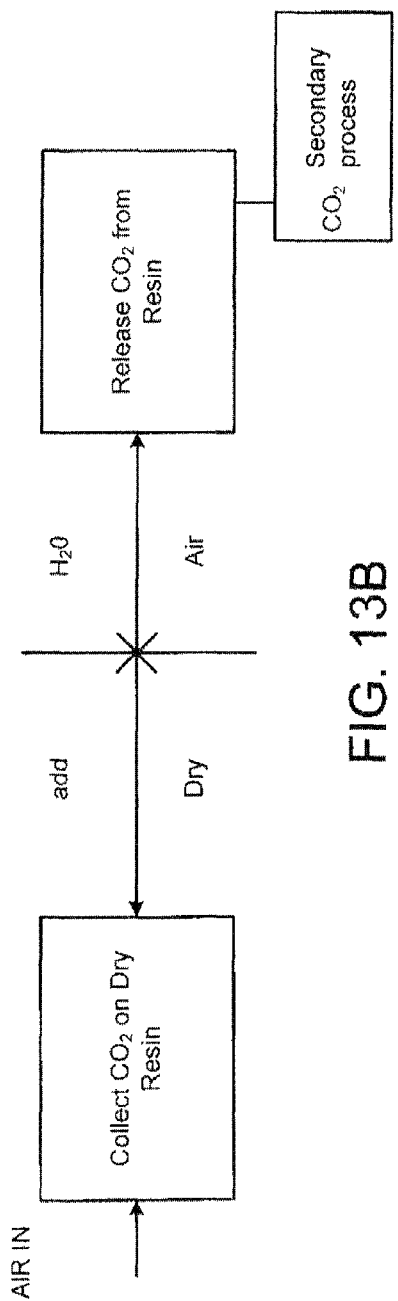
FIG. 13B is a schematic showing an ion exchange process for capturing $CO_2$ where valves are used to control flow between chambers.

In another example, $CO_2$ is captured and removed from air on a solid phase ion-exchange resin, which is placed in a plurality of chambers connected in series. See FIG. 13A. The resins in the different chambers have been exposed for different length of time to the outgassing process. Resins may be moved from chamber to chamber, or more likely as shown in FIG. 13B, the valving is changed to take a chamber from the purged end of the chain, remove its charge and fill it with a resin which is now put on the unpurged end of the chain. The gas in each chamber is composed of water vapor, $CO_2$ and possibly an inert sweep gas. The sum of the three partial pressures monotonically declines from the upstream end of the system to the downstream end of the system. Increasing the flow speed can reduce the sweep gas pressure, but the water vapor pressure is more or less in equilibrium with the liquid water at this point. The $CO_2$ pressure should increase in the direction of the sweep. If the water vapor is a large part of the total pressure, the water vapor pressure gradient controls the flow and it would be established by a temperature drop from one chamber to the next, while the $CO_2$ pressure will rise from one chamber to the next, as each chamber is adding some $CO_2$ to the flow. The contributions of each chamber will be limited by the rate at which the material can release $CO_2$ and the equilibrium pressure that particular resin can reach.

Figure 14:
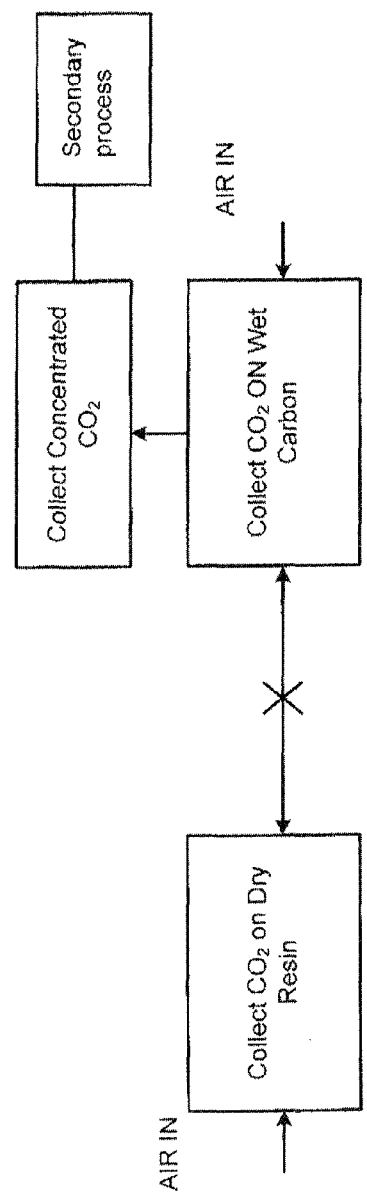
FIG. 14 is a schematic showing an ion exchange process for capturing $CO_2$ employing activated carbon in accordance with another aspect of the present disclosure.

In yet another example $CO_2$ is captured and removed from air by employing hydrophobic activated carbon materials with strong base ion exchange resins. See FIG. 14. This latter process is based on observation that activated carbon has been observed to absorb $CO_2$ when wet, and release the absorbed $CO_2$ as it dries. This is the opposite behavior from ion exchange resins. Accordingly, this makes it possible to couple solid phase ion exchange resin extractors and activated carbon extractors in sequence. Starting with dry activated carbon and moistened resin materials air is passed through the system. As the air dries the resin, it transports the water vapor to the carbon. The resin picks up $CO_2$ as it dries, and the activated carbon picks up $CO_2$ as it accepts moisture. Once the resin is dry, the system is reversed, and fresh air is flowed through the activated carbon, and releases moisture back to the ion exchange resins. As the carbon dries it gives off $CO_2$, raising the $CO_2$ partial pressure where it can be concentrated and removed. A feature and advantage of coupling ion exchange material and activated carbon in this manner is that water is preserved, and is a simple matter of valving to reverse air flow. Alternatively, zeolite materials may be used in place of activated carbon. By stringing several air capture devices together, the ambient $CO_2$ removed may be concentrated.

Figure 15:
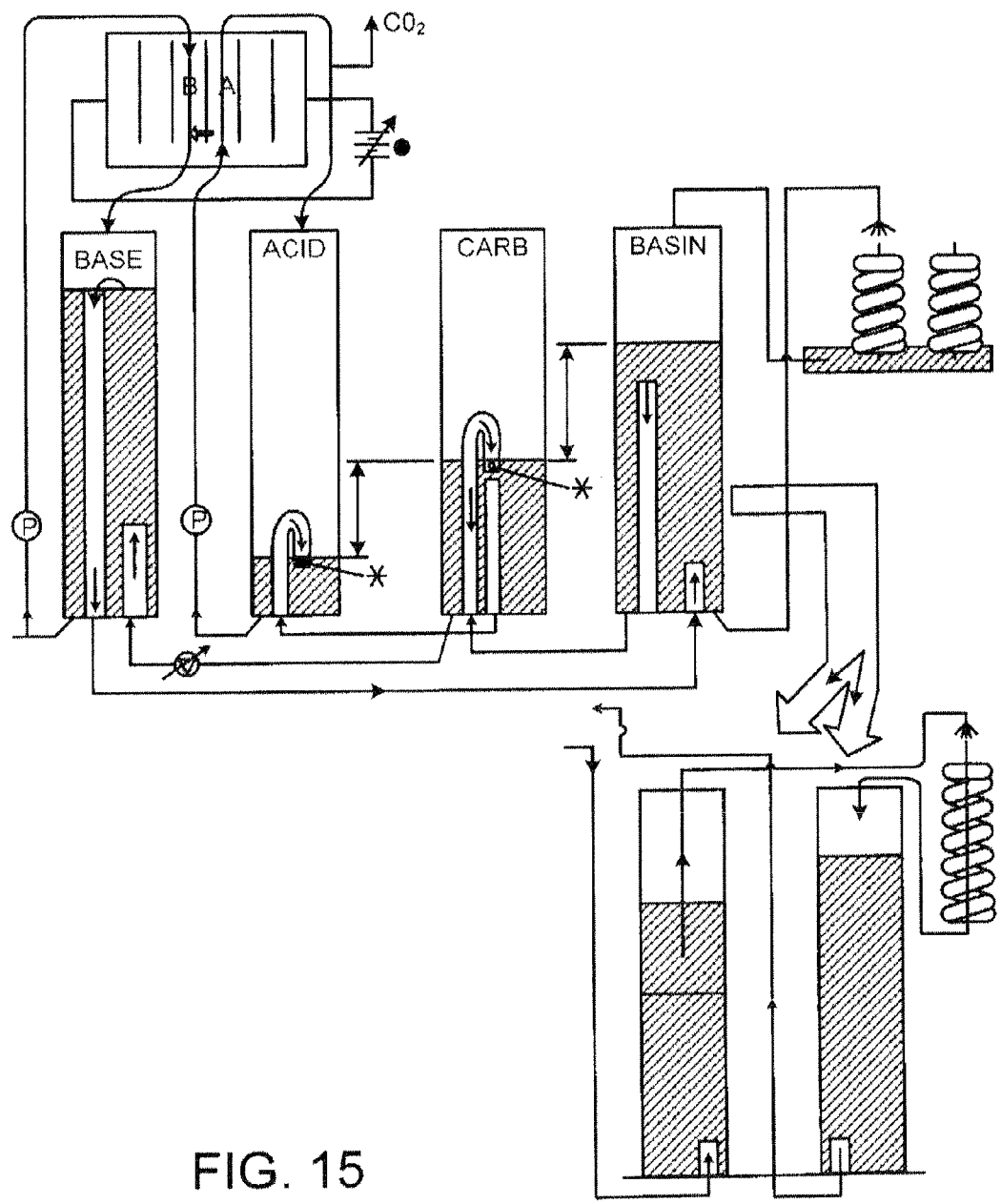
FIG. 15 is a schematic of an apparatus of the present disclosure having an electrodialysis cell according to another aspect of the present invention.

In another aspect of the present disclosure shown in FIG. 15, $CO_2$ is captured using ion exchange materials and concentrated using an electrodialysis (ED) cell. The overall process is as follows: The ion exchange resin is washed using a basic solution, such as sodium carbonate ($Na_2CO_3$), preferably having a pH of 11-12. The resulting effluent, which in the example of a sodium carbonate wash will be primarily sodium bicarbonate ($NaHCO_3$), will preferably have a pH of 9-10. The effluent is then supplied to the acid side of an ED cell, where the reaction is controlled through bipolar and cationic membranes. After an initial run, the acidic side of the cell stabilizes at a near neutral pH, at which point $CO_2$ evolves and is captured. Osmotic pressure drives water towards the base side of the cell. The basic solution is maintained near a pH of 12 and may also be used to replenish the wash fluid.

Figure 16:
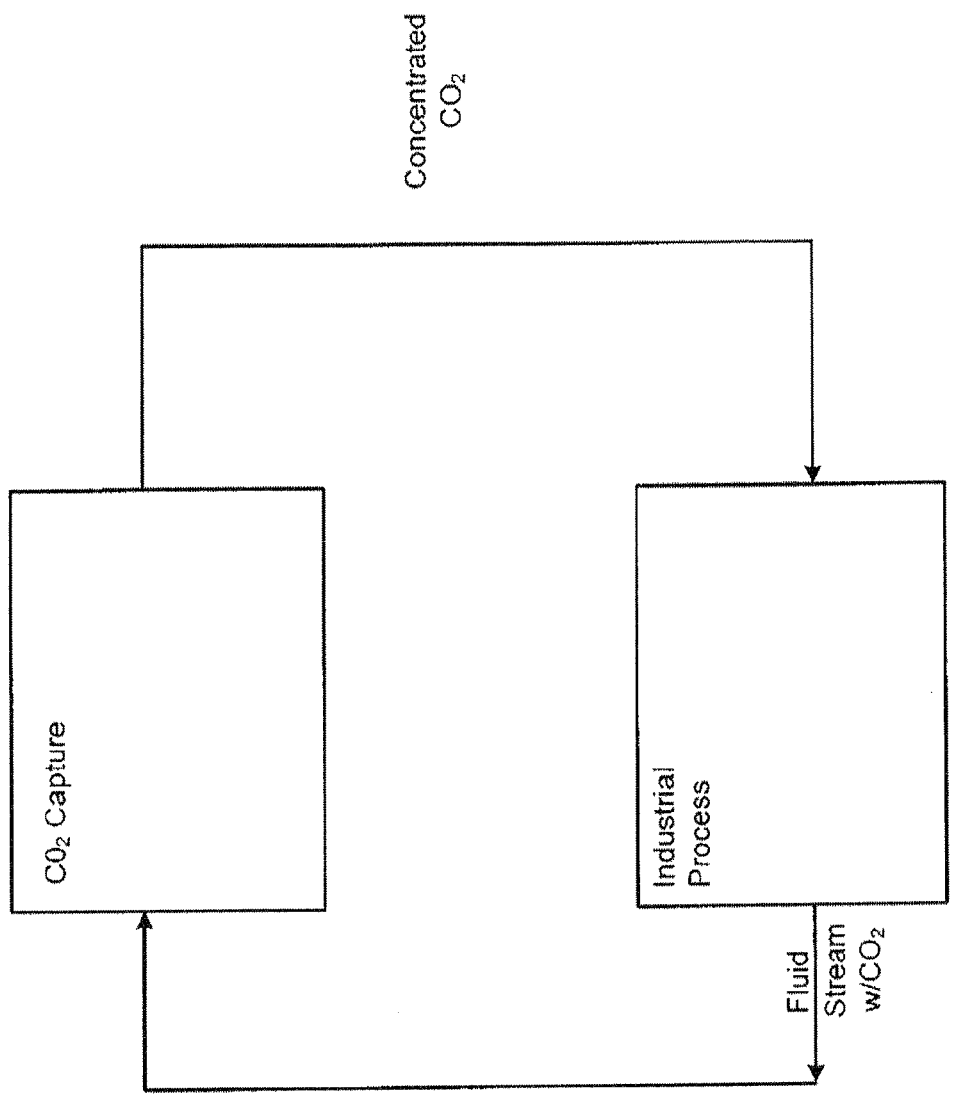
FIG. 16 is a schematic showing a system for capturing $CO_2$ in accordance with one aspect of the present disclosure wherein the $CO_2$ capture device works in tandem with an industrial process to create an essentially carbon neutral system.

In another exemplary embodiment shown in FIG. 16, the present disclosure provides a system that is substantially carbon neutral, wherein an air capture device, such as those described herein, collects $CO_2$ that is released by an industrial process employing $CO_2$. For example, such processes include the use of $CO_2$ as a refrigerant, as a dry cleaning agent or other solvent, as a fire suppression material, as an oxidation preventing shield-gas in welding, as an alternative to sand-blasting, as a freezing agent in food processing, or any other process where $CO_2$ is utilized and is later released to the atmosphere. The system effectively creates a loop that is substantially carbon neutral. The air capture device may, for example, be connected the HVAC system of a building where $CO_2$ is released by processes therein. With the present disclosure, $CO_2$ is captured, concentrated and recycled for reuse on site.

The disclosure also may be used to generate carbon credits. Thus, a manufacturer may extract $CO_2$, and obtain a carbon credit which may be traded or sold, or use the extracted $CO_2$ in a secondary process, eliminating the cost of purchasing or generating $CO_2$ for a secondary process.

Yet another aspect of the present disclosure provides an improved design for previously disclosed devices, processes and methods designed to capture carbon dioxide from the atmosphere utilizing a $CO_2$ selective sorbent that can be regenerated by providing water, humidity or low grade steam with temperatures that can be well below 100° C. (212° F.). While it is sometimes possible to operate such a system at ambient temperatures and simply take advantage of the difference between relative humidity in the ambient air and the maximum partial pressure of water vapor that can be achieved at ambient conditions, it is often advantageous to raise the temperature of the resin during the recovery so as to allow for a higher partial pressure of water vapor.

In co-pending PCT application Serial No. PCT/US08/60672, assigned to a common assignee, incorporated by reference herein, we have discussed temperature ranges from 30° C. (86° F.) to 50° C. (122° F.), which is the optimal temperature range discussed here. However, the utility of the methods described herein are not intended to be limited to a specific temperature range. In other words, the present disclosure provides methods and apparatus that are able to operate efficiently outside the optimal temperature range.

The above mentioned co-pending PCT application Serial No. PCT/US08/60672, describes a carbon dioxide ($CO_2$) capture process which comprises bringing a gas stream in contact with a resin, wetting the resin with water, collecting water vapor and carbon dioxide from the resin, and separating the carbon dioxide from the water vapor. The resin may be placed in a chamber or a plurality of chambers connected in series wherein said first chamber contains resin that was most recently saturated with carbon dioxide from the gas stream, and each successive chamber contains resin which has been wetted and carbon dioxide collected from for a greater period of time than the previous chamber, and so on until the last chamber. The plurality of chambers are connected by a plurality of valves that allow any of the plurality of chambers to serve as said first chamber.

This aspect of the disclosure describes a method, and the necessary apparatus, plus the overall process scheme, to fully or partially dry the wet resin in the first chamber, while transferring the moisture to the originally dry resin in the second chamber.

In the present disclosure, the sorbent material preferably is an ion exchange resin, but equally applies to all sorbents that can absorb $CO_2$ at low levels of moisture and will release the $CO_2$ at higher partial pressures of water vapor. To achieve a process where the sorbent performs at higher values of water vapor pressures, it may be necessary to raise the temperature of the resin.

The sorbent may alternatively be comprised of other materials, including zeolites, activated carbon, weak base amines, or a combination thereof. A comprehensive discussion of these and other materials can be found in co-pending patent applications assigned to a common owner, including, U.S. patent application Ser. No. 11/683,824; U.S. patent application Ser. No. 12/389,213 each of which is incorporated by reference herein.

The present disclosure provides a configuration, in which there is a resin air collector placed into a first chamber, the atmosphere within the first chamber containing sufficient moisture to free most or all of the captured $CO_2$ that was attached to the resin, the $CO_2$ having been released from the ion exchange resin by a humidity swing, as described in co-pending PCT Application Serial No. PCT/US08/60672, the $CO_2$ having been further removed from the chamber. The chamber retains the released $CO_2$ and a large amount of moisture that has been adsorbed onto the filter resin. The first chamber should be tightly sealed so as to be capable of maintaining a vacuum pressure when required.

The configuration also comprises a second chamber filled with a $CO_2$ loaded resin that is still dry, wherein the air has been evacuated from the second chamber, by some appropriate means.

At the start of the process, the two chambers are isolated from the rest of the $CO_2$ recovery system that may be part of a larger system, and they are also isolated from each other, preferably by one or more valves. By opening one or more valves, a connection between the two chambers is established.

Rather than just opening a passage between the two chambers that would allow uncontrolled flow in either direction, it is important that the flow direction is established so that there is positive gas flow from the first chamber to the second chamber. Initially, this will be accomplished by the natural pressure gradient between the first chamber filled with water vapor in equilibrium with its environment, which typically is at a temperature above ambient conditions, and the lower residual pressure in the second chamber, which typically will be under-saturated in water vapor and also lower in temperature.

The dry resin will absorb humidity, which thermodynamically is akin to condensation and thus releases a comparable amount of heat. Without wishing to be bound by theory, if this were not the case, the resin would be unable to absorb moisture, as this requires a free energy change that is negative, in the face of an entropy change which is dominated by the high entropy of the gaseous water vapor. Hence to overcome the "TΔS" term in the free energy equation, a similarly large enthalpy change is required.

In the initial stages of the process this absorption will maintain a pressure gradient between the two chambers. Therefore, with an appropriate amount of throttling of the flow, such as by use of a throttling valve for the connection between chambers, a unique flow direction can be maintained. Since at the same time water is evaporating in the first chamber and condensing in the resin chamber (or is being released from the sorbent in the first chamber and absorbed in the second chamber) there is a substantial amount of heat that is being transferred from the first chamber to the second chamber.

The amount of water being absorbed in the second chamber is capable of inducing a temperature swing of many tens of degrees, far more than is actually necessary to transfer heat from the first chamber to the second chamber. In rough terms, 1 mole of water can heat 1 kg (2.205 lbs) of resin by approximately 20° C. (approximately 68° F.). One kilogram of resin can hold far more water than that.

The spontaneous gas flow from the first chamber to the second chamber will slow down and eventually cease as the two water vapor pressures reach equilibrium. Equilibration will be driven by the temperature differential and the change in saturation levels of the resins.

As the system approaches equilibrium, a small low pressure pump may be used to keep pumping water vapor from the first chamber to the second chamber. In this way it is possible to transfer water from the first chamber to the second chamber. While initially the temperature in the second chamber was typically lower than that of the first chamber, the pumping action will lead to additional condensation in the second chamber raising its temperature above that of the first chamber.

As the temperature differential increases, heat transfer may be used to reduce the temperature gradient between the second chamber and the first chamber. This can be done by a variety of means known to practitioners in the art. For example, it is possible to use liquid filled heating coils inside of which circulates a heat transfer liquid between the two chambers. In situations where the heat transfer may be particularly cumbersome, it is also possible to cool the second chamber against ambient conditions, whereas the first chamber is heated against ambient conditions.

The pumping effort may be maintained until a desired moisture level has been accomplished in the first chamber, or until a desired moisture level has been reached in the seconded chamber. Since the primary objective is to minimize water losses to the environment, it is preferably the conditions in the first chamber which will control the extent of the pumping actions. Alternatively, it is possible to let some or all of the remaining excess moisture in the first chamber evaporate into ambient air after the chamber has been opened to the air. This alternative saves energy, at the expense of consuming water.

It also may be possible to drive the moisture level of the first chamber down until it matches the moisture level in ambient air. If pumping of water vapor is maintained until the partial pressure of water vapor in the first chamber is below the partial pressure of water vapor in ambient air, the result will be that the system will collect water from the atmosphere rather than consume water.

In an embodiment wherein the complete system is designed to collect water rather than consume water, the system efficiency may be increased in other aspects, as allowed under a given set of circumstances. Since the process does not consume water, it is possible in such a design to begin the regeneration cycle with the full immersion of the resin into deionized (or distilled) water. The water used may have gone through multiple condensation cycles to achieve the appropriate quality. Energy may be conserved as it is requires much less energy to evacuate a water-filled chamber by pumping out water, then it is to evacuate an air-filled chamber by pumping air. In this case it is important to keep the water in a closed storage system, as it will be saturated in $CO_2$ and uncontrolled release of the $CO_2$ from the water should be avoided in most applications of such a device.

Once the resin is wet and the system is evacuated the counterflow arrangement is similar to those discussed in the aforementioned co-pending applications. In this embodiment, however, it may not be necessary to operate the chambers at elevated temperatures, as a benefit of the immersion of the resin. This embodiment may also allow for a chain of chambers to be connected as gas is slowly pumped from the beginning of the chain, which contains the most carbon depleted resin, to the last which contains the freshest most carbon loaded resin. (It is this last chamber which just has been flushed with water and evacuated.)

The gas is pumped slowly out of the last chamber into the beginning of a gas compression train, in which water may be condensed out of the water vapor/$CO_2$ mixture. Instead of compressing the gas stream after it has been removed, it also is possible to consider other applications of the water vapor/$CO_2$ mixture. Where the gas is compressed the water condensed during this step can be returned into the process.

The chambers may be connected with a plurality of pipes, pumps and valves so that the aforementioned chain of chambers can begin at any chamber and end at any other chamber including all those chambers in the arrangement that are logically between the first and the last. By arranging the chambers in a circle or similar spatial arrangement, any chamber can operate as the first or the last chamber by controlling valving between chambers. It usually is not necessary to arrange chambers in arbitrary order, but with the appropriate piping and valving this could be achieved as well.

Once a chamber has been sufficiently depleted of $CO_2$ and has been effectively removed from the chain, it is then entered into the water recovery step. This chamber now functions as the "first chamber" according to our discussion above. It is then paired with an additional chamber, which plays the role of the second chamber in the previous discussion.

In an alternative embodiment, the second chamber has been wetted immediately in a water flush, and thus the first step of the previous cycle where water vapor spontaneously flows from a high moisture chamber, to a low moisture chamber, has been eliminated. In this case, pumping action will be utilized from near the beginning of the process (there may be a little temperature difference which drives a small amount of transfer). The water vapor from the first chamber could still be pumped into the second chamber.

Another more practical approach is to pump the water vapor from the first chamber back into the water reservoir, which holds all the water that is present in the system. The amount of water will not only be augmented with additional water that condenses into this chamber but it will also absorb the heat of condensation that is released in the process. The first chamber will have to have heat contact with the outside in order to avoid cooling down in the drying process.

By extending this pumping cycle for a sufficient amount of time, it is possible to collect water from the atmosphere rather than losing water to the atmosphere. Such a system, while it consumes more energy than the aforementioned water vapor cycles that accomplish the bulk of the sorbent drying in the open air, can operate with great efficiency in terms of water consumption. Also, such a process will run faster by shortening the wetting cycle with a liquid water flush. As the drying cycle pumps water into a large reservoir its speed is not limited by heat transfer concerns, thus potentially speeding up the drying cycle. The evacuation system is also greatly simplified.

For every mole of water that is transferred, however, mechanical energy is spent. A mole of water at 0.01 bars requires 1 kPa×2.6 $m^3$ (at 45° C. (113° F.)) are 2.5 kJ/mole. The heat return is about 40 kJ/mole. The amount of water to be transferred could easily exceed 20 moles per mole of $CO_2$. This would result in a 50 kJ/mole energy penalty. Thus, the optimal configuration will be determined by the specific conditions in which the system operates.

It should be emphasized that the above-described embodiments of the present device and process, particularly, and "preferred" embodiments, are merely possible examples of implementations and merely set forth for a clear understanding of the principles of the disclosure. Many different embodiments of the disclosure described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

The invention claimed is:

1. A method for capturing carbon dioxide from an air stream, comprising exposing one or more collection surfaces formed of a solid sorbent material to an air stream, wherein the solid sorbent material comprises an ion exchange material and absorbs carbon dioxide from the air stream, and wherein the air stream is laminar, or close to the laminar regime.

2. The method of claim 1, wherein the solid sorbent material comprises a supporting substrate covered at least in part by a layer of a sorbent.

3. The method of claim 2, wherein the layer of said sorbent comprises a film covering the surface.

4. The method as described in claim 1, comprising one or more of the following features:
   (a) wherein the collection surfaces are smooth parallel plates;
   (b) wherein the collection surfaces follow straight lines or nearly straight lines in the direction of the air stream;
   (c) wherein the collection surfaces comprise corrugations, pipes, tubes, or angular shapes; and
   (d) wherein the collection surfaces form a monolith structure, including but not limited to a honeycomb pattern where openings follow straight lines crossing the monoliths.

5. The method of claim 1, wherein the collection surface is roughened in a regular or random manner, wherein the roughening is described by one or more of the following:
   (a) the roughening creates a plurality of features including one or more from a group consisting of: grooves, dimples, bumps, fibers and dendrites;
   (b) the roughening creates a plurality of features that are smaller than the flow channels and smaller than the diffusion boundary layer thickness;
   (c) the roughening results in an air stream having a Reynolds number that is less than about 100;
   (d) the surface roughening is accomplished by sandblasting or grinding;
   (e) the surface roughening is accomplished by etching or other chemical application;
   (f) the surface roughening is accomplished by foaming the sorbent material either throughout the body of the matrix structure or on the coating surface;
   (g) the collection surface is made from a foam or foam like material; and
   (h) the collection surface is made of highly porous materials including but not limited to activated carbon materials.

6. The method of claim 1, wherein the collection surfaces are arranged in a manner that is described by one or more of the following:
   (a) wherein the collection surfaces are thin films selected from the group consisting of foils, corrugated foils, and a combination thereof;
   (b) wherein the collection surfaces are stacked and kept apart by spacers or bumps on the collection of surfaces;
   (c) wherein the collection surfaces are supported by one or more wires or a wire netting;
   (d) wherein the collection surfaces are supported on a rigid structure selected from the group consisting of a solid plate, a honeycomb, and a lattice work;
   (e) wherein the collection surfaces comprise thin plates that are held together with wires in a Venetian blind style;
   (f) wherein the collection surfaces form cylindrical, elliptical or spherical shapes through which the air stream can pass; and
   (g) wherein the collection surfaces are circular and form a vertical disc stack.

7. The method of claim 1, further comprising one or more of the following features:
   (a) wherein the direction of the air stream is horizontal;
   (b) wherein the collection surfaces are spaced about 0.3 cm to 3 cm from one another;
   (c) wherein the air stream follows a path through a scrubber that is between about 0.1 m to 3 m in length; and
   (d) wherein the air stream has an average speed of between about 1 m/s and 20 m/sec.

8. The method of claim 1, further comprising ensuring substantial alignment between the collection surfaces and an instantaneous wind field through the use of flow straighteners.

9. The method of claim 8, further comprising steering the at least one of the collection surfaces so that it points into or parallel to the wind.

10. The method of claim 1, wherein the collector surfaces form a scrubber that utilizes a pressure drop across the scrubber to cause the air stream to travel through the scrubber under laminar flow conditions, wherein the method is described by one of the following:
    (a) wherein the pressure drop is induced by a stagnation of flow on the upwind side of the scrubber;
    (b) wherein the pressure drop is induced by a Bernoulli-type pressure reduction;
    (c) wherein the pressure drop is caused by thermal convection;
    (d) wherein the pressure drop is created by one or more fans;
    (e) wherein the pressure drop is created by placing the scrubber into a cooling tower flow path;
    (f) wherein the pressure drop is created by placing the scrubber into the flow of a convection tower or chimney; and
    (g) wherein the pressure drop is created by katabatic winds or naturally occurring thermal convection.

11. The method of claim 1, further comprising recovering carbon dioxide from the collection surfaces using one or more of the following steps:
    (a) wherein the solid sorbent material is washed with a washing fluid to remove the carbon dioxide from the solid sorbent material, said washing fluid being selected from the group consisting of alkaline solutions, carbonate solutions, amine solutions, and sodium hydroxide solutions;
    (b) wherein the solid sorbent material is heated to promote release of carbon dioxide either into a washing fluid or into a gaseous collection stream;

(c) wherein the collection surfaces reside within a chamber, and wherein the chamber is evacuated prior to treating the solid sorbent material to release carbon dioxide;

(d) wherein the collector surfaces are brought in contact with a secondary sorbent that reduces the carbon dioxide partial pressure in the system; and (e) wherein the collection surfaces reside within a chamber, and wherein the carbon dioxide is released by the collection surfaces into the chamber, wherein the carbon dioxide is pumped out of the chamber.

12. The method of claim 1, further comprising releasing the absorbed carbon dioxide by exposing the solid sorbent material to water or water vapor, which drives the release of carbon dioxide according to a humidity swing, resulting in a gaseous collection stream that includes water vapor and carbon dioxide, wherein the release of carbon dioxide is further described by one or more of the following features:

(a) wherein the collection surfaces reside within a chamber, and wherein the partial pressure of carbon dioxide within the chamber is reduced by moving the chamber into a cold trap;

(b) wherein the collection surfaces reside within a chamber, wherein carbon dioxide is separated from water vapor by compressing the gaseous collection stream in the chamber; and (c) wherein the carbon dioxide is separated from the water vapor by cooling the gaseous collection stream until the water condenses or freezes out.

13. The method of claim 1, further comprising the step of removing the carbon dioxide from the collection surfaces, wherein the collection surfaces are part of a scrubber that is placed in a regeneration chamber for removing the carbon dioxide from the collection surfaces, and wherein the scrubber is collapsed in volume before or as it introduced into the regeneration chamber.

* * * * *

UNITED STATES PATENT AND TRADEMARK OFFICE
CERTIFICATE OF CORRECTION

PATENT NO. : 8,999,279 B2
APPLICATION NO. : 12/996589
DATED : April 7, 2015
INVENTOR(S) : Allen B. Wright et al.

Page 1 of 1

It is certified that error appears in the above-identified patent and that said Letters Patent is hereby corrected as shown below:

In the Claims:

Claim 5, Column 17, Line 60, delete "or foam like"

Signed and Sealed this
Twenty-fourth Day of May, 2016

Michelle K. Lee
*Director of the United States Patent and Trademark Office*